United States Patent
Goto et al.

(10) Patent No.: US 8,514,443 B2
(45) Date of Patent: Aug. 20, 2013

(54) SHEET MUSIC EDITING METHOD AND IMAGE PROCESSING APPARATUS

(75) Inventors: Fumihiro Goto, Kawasaki (JP); Ayumi Hori, Kawasaki (JP); Manabu Yamazoe, Tokyo (JP); Tohru Ikeda, Yokohama (JP); Maya Ishii, Kawasaki (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/336,269

(22) Filed: Dec. 16, 2008

(65) Prior Publication Data

US 2009/0161164 A1 Jun. 25, 2009

(30) Foreign Application Priority Data

Dec. 21, 2007 (JP) ................................ 2007-331071

(51) Int. Cl.
*G06K 15/00* (2006.01)
*G06K 9/00* (2006.01)
*G10G 3/04* (2006.01)
*G10G 7/00* (2006.01)
*G10H 1/00* (2006.01)

(52) U.S. Cl.
USPC ............ 358/1.18; 382/113; 382/181; 84/462; 84/486; 84/600; 84/601

(58) Field of Classification Search
USPC .................. 358/1.18; 382/113, 181; 84/462, 84/486, 600, 601
See application file for complete search history.

(56) References Cited

U.S. PATENT DOCUMENTS

| | | | |
|---|---|---|---|
| 4,958,551 A | 9/1990 | Lui | |
| 5,690,496 A | 11/1997 | Kennedy | |
| 5,706,363 A | 1/1998 | Kikuchi | |
| 5,864,631 A * | 1/1999 | Shutoh | ......................... 382/113 |
| 5,931,680 A | 8/1999 | Semba | |
| 6,169,239 B1 | 1/2001 | Aiardo | |
| 6,175,070 B1 | 1/2001 | Naples et al. | |
| 6,333,455 B1 | 12/2001 | Yanase et al. | |
| 6,365,819 B2 | 4/2002 | Yamada | |
| 6,380,471 B2 | 4/2002 | Matsumoto | |
| 6,545,208 B2 | 4/2003 | Hiratsuka | |
| 6,580,805 B1 | 6/2003 | Nakano | |
| 6,635,815 B2 | 10/2003 | Kosakaya | |

(Continued)

FOREIGN PATENT DOCUMENTS

| | | | |
|---|---|---|---|
| CA | 2120657 A | 7/1995 | |
| JP | 05-035924 A | 2/1993 | |

(Continued)

*Primary Examiner* — Vu B Hang
*Assistant Examiner* — Neil R McLean
(74) *Attorney, Agent, or Firm* — Canon USA Inc IP Division

(57) ABSTRACT

There is provided an image processing method of laying out and outputting an image of an original formed from a plurality of pages on one page, the method comprising: inputting image data of the original formed from the plurality of pages; dividing the image data input in the inputting into a plurality of blocks; discarding unnecessary information; appending necessary information to each block obtained by division in the dividing based on the predetermined rule; replacing the respective blocks obtained by division in the dividing with the block from which the unnecessary information is discarded in the discarding, and the block to which the necessary information is appended in the appending; and outputting the respective blocks which have undergone replacement in the replacing by laying out the respective blocks on one page.

13 Claims, 23 Drawing Sheets

(56) References Cited

U.S. PATENT DOCUMENTS

| | | |
|---|---|---|
| 6,727,418 B2 | 4/2004 | Matsumoto |
| 6,809,246 B2 | 10/2004 | Errico |
| 6,945,784 B2 | 9/2005 | Paquette et al. |
| 7,074,999 B2 | 7/2006 | Sitrick et al. |
| 7,094,960 B2 | 8/2006 | Ikeya et al. |
| 7,098,392 B2 | 8/2006 | Sitrick et al. |
| 7,479,595 B2 | 1/2009 | Shen et al. |
| 7,579,541 B2 | 8/2009 | Guldi |
| 7,649,134 B2 * | 1/2010 | Kashioka ............... 84/600 |
| 7,703,014 B2 | 4/2010 | Funaki |
| 7,728,212 B2 | 6/2010 | Fujishima et al. |
| 7,763,790 B2 | 7/2010 | Robledo |
| 7,838,755 B2 | 11/2010 | Taub et al. |
| 7,919,703 B2 | 4/2011 | Hong et al. |
| 2001/0023633 A1 | 9/2001 | Matsumoto |
| 2002/0005109 A1 | 1/2002 | Miller |
| 2002/0118562 A1 | 8/2002 | Hiratsuka |
| 2003/0005814 A1 | 1/2003 | Matsumoto |
| 2004/0069115 A1 | 4/2004 | Hiratsuka et al. |
| 2004/0112201 A1 | 6/2004 | Funaki |
| 2005/0016361 A1 | 1/2005 | Ikeya et al. |
| 2005/0016368 A1 * | 1/2005 | Perla ............... 84/723 |
| 2006/0150803 A1 | 7/2006 | Taub |
| 2007/0022866 A1 | 2/2007 | Perla |
| 2007/0227336 A1 * | 10/2007 | Fukada ............... 84/600 |
| 2007/0261536 A1 | 11/2007 | Shen et al. |
| 2007/0295194 A1 | 12/2007 | Reverdin |
| 2008/0060500 A1 | 3/2008 | La et al. |
| 2008/0092723 A1 | 4/2008 | Sawyer-Kovelman et al. |
| 2008/0156171 A1 | 7/2008 | Guldi |
| 2008/0289477 A1 | 11/2008 | Salter |
| 2009/0013855 A1 | 1/2009 | Fujishima et al. |
| 2009/0095144 A1 | 4/2009 | Nakano |
| 2009/0158915 A1 | 6/2009 | Ishii et al. |
| 2009/0161164 A1 | 6/2009 | Goto et al. |
| 2009/0161176 A1 | 6/2009 | Yamazoe et al. |
| 2009/0161917 A1 | 6/2009 | Hori et al. |
| 2010/0024629 A1 | 2/2010 | Hiratsuka |
| 2010/0089221 A1 | 4/2010 | Miller |

FOREIGN PATENT DOCUMENTS

| | | |
|---|---|---|
| JP | 06-102869 A | 4/1994 |
| JP | 06-102870 A | 4/1994 |
| JP | 06-102871 A | 4/1994 |
| JP | 06-149235 A | 5/1994 |
| JP | 06-149236 A | 5/1994 |
| JP | 07-129156 A | 5/1995 |
| JP | 07-304245 A | 11/1995 |
| JP | 07-311543 A | 11/1995 |
| JP | 2879941 B | 4/1999 |
| JP | 2000-163044 A | 6/2000 |
| JP | 3169142 B | 5/2001 |
| JP | 2002-144664 A | 5/2002 |
| JP | 2003-015636 A | 1/2003 |
| JP | 2003-177745 A | 6/2003 |
| JP | 2003-288075 A | 10/2003 |
| JP | 3801939 B | 7/2006 |
| JP | 2009-086973 A | 4/2009 |

* cited by examiner

FIG. 3
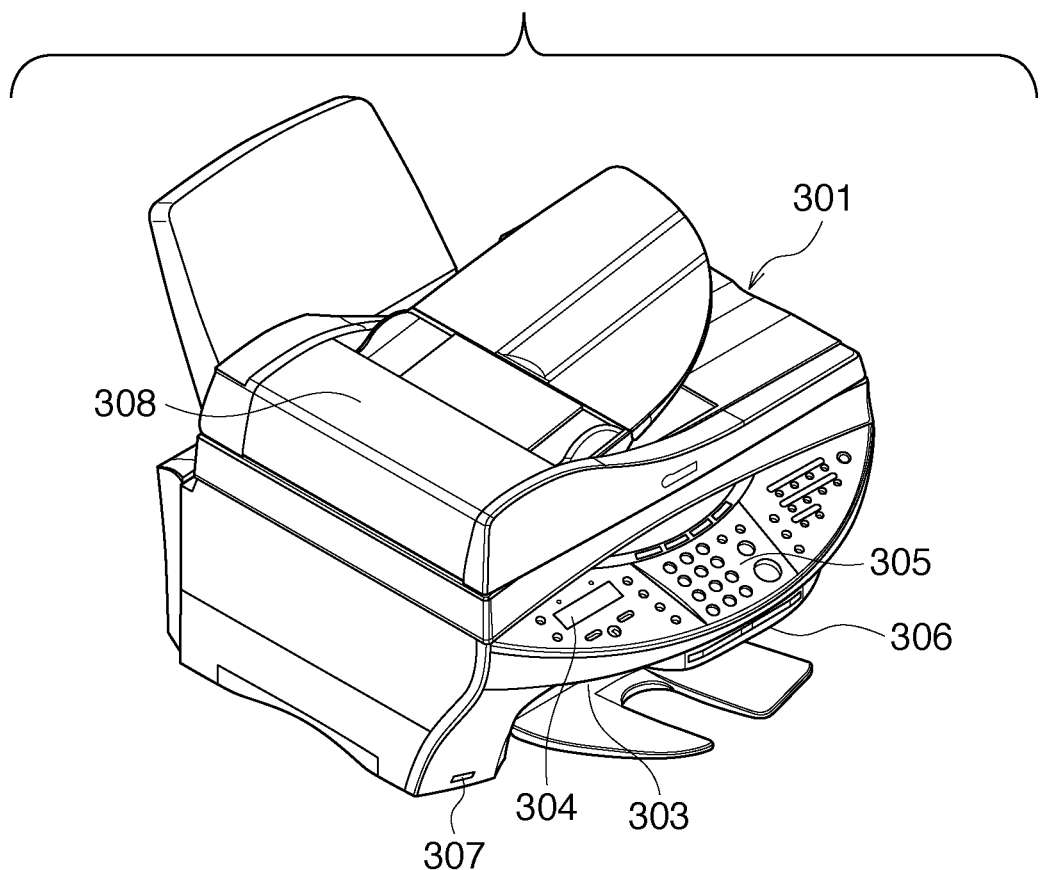
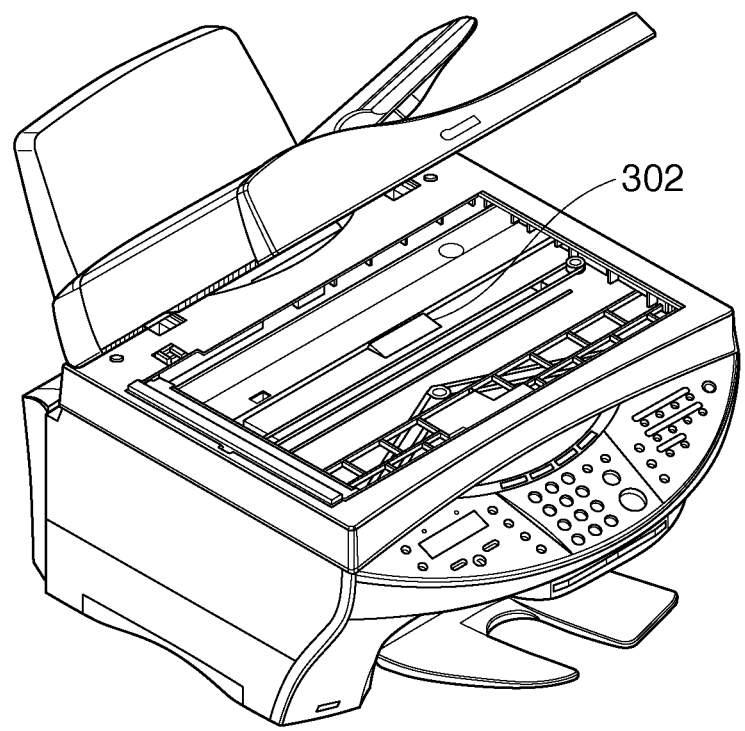

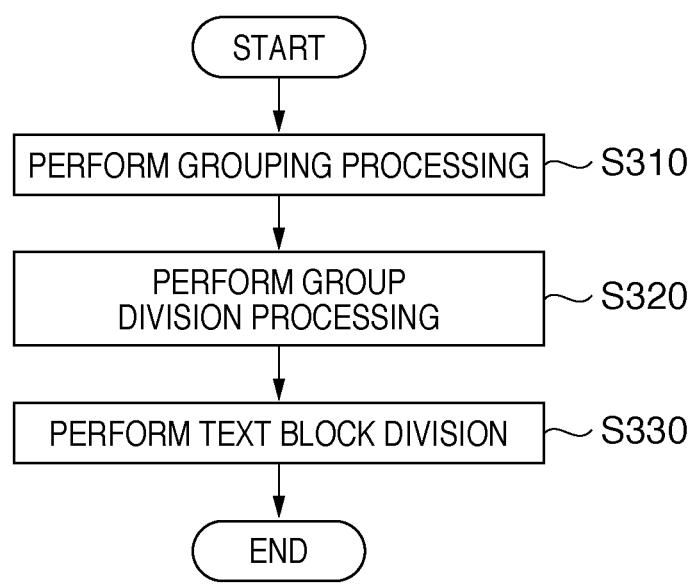
F I G. 14

F I G. 16
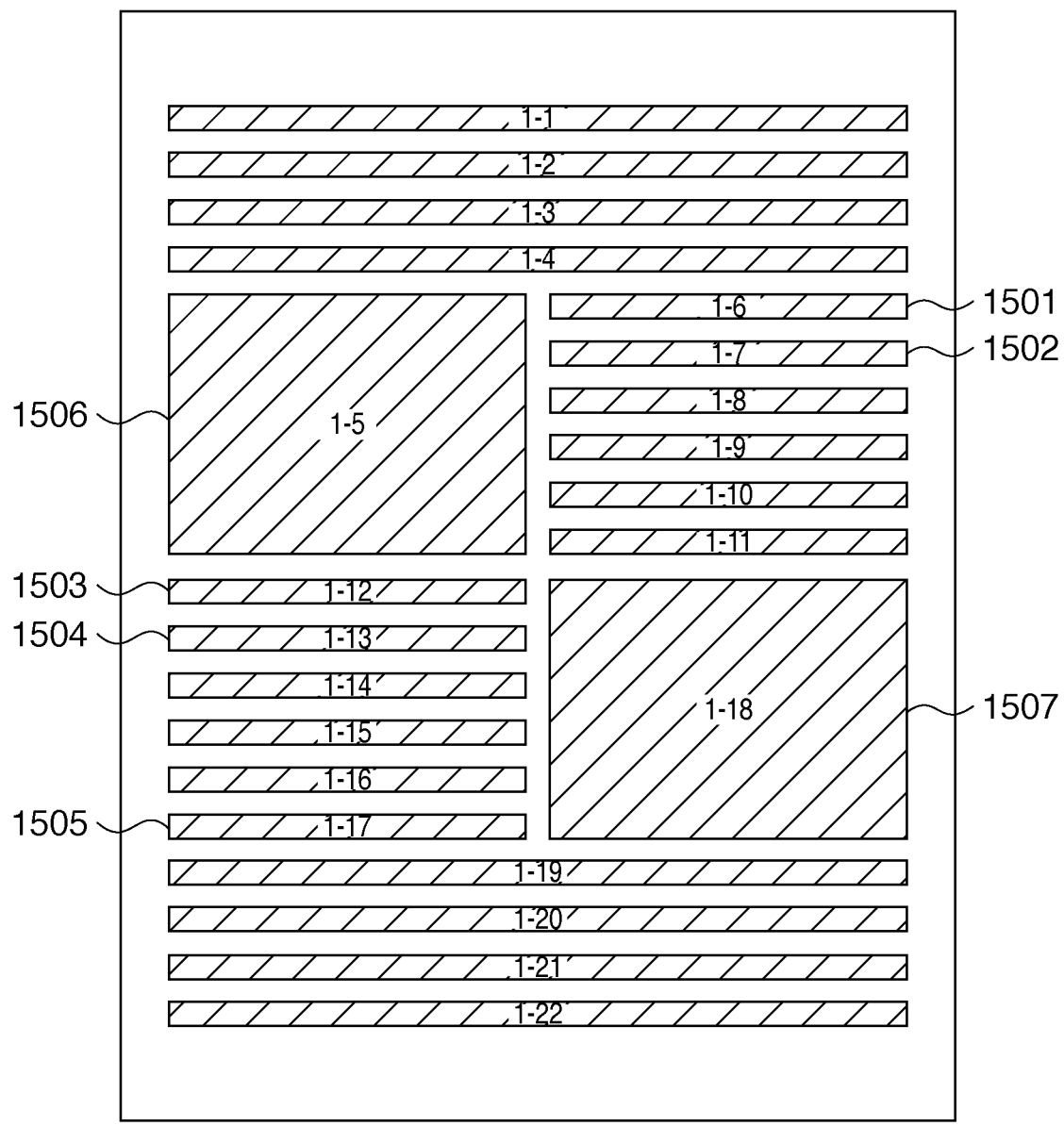

SHEET MUSIC EDITING METHOD AND IMAGE PROCESSING APPARATUS

BACKGROUND OF THE INVENTION

1. Field of the Invention

The present invention relates to an image processing method and image processing apparatus for editing and outputting image data acquired from an input device.

2. Description of the Related Art

As low-cost scanner devices become available, an original can be easily scanned and converted into digital data even at home. Inkjet printers as printing apparatuses have been developed, and even a multifunctional peripheral (MFP) called a multi-function printer capable of not only printing an image, but also scanning an image becomes popular. The user can use a scanner device and printer device to easily copy his originals and contents at home.

An example of contents which improve user's convenience when copied is "sheet music". In general, the user purchases sheet music as a book. However, it impairs user's convenience to set sheet music purchased as a book directly on a music stand. For example, when the user sets sheet music of many pages directly on a music stand to see a desired page, he must forcibly open the sheet music, damaging the sheet music. To prevent this, a music stand devised to fix sheet music at a desired page is also commercially available. However, such a music stand makes it difficult to turn a page. It is generally cumbersome to turn a page of sheet music during the performance. This work is very troublesome especially during the performance of a musical instrument using both hands, such as the piano.

During the music lesson of the piano or the like, the teacher often writes an instruction directly on sheet music. It is popular to copy sheet music and keep the original clean.

When editing and distributing sheet music of a composition by a user or when editing music composed in response to user's request and distributing it as sheet music, various editing operations are required. For this purpose, a technique for, for example, editing sheet music is disclosed.

To reduce the number of page turns, a musician sometimes arranges and prints a plurality of pages of sheet music on one paper sheet. By using the layout copy function of an MFP, a plurality of pages of sheet music as a purchased book can be arranged and copied on one paper sheet. When sheet music data is saved in a PC, the player can designate layout printing via a printer driver to print a plurality of pages of sheet music on one paper sheet.

The following techniques have been disclosed as patents regarding layout printing and editing of an image such as sheet music.

Japanese Patent Laid-Open No. 2002-144664 discloses a method of dividing a 1-page original image into a predetermined number of output areas, arranging different types of documents in the respective output areas in correspondence with each other, and outputting the documents.

Japanese Patent No. 2879941 discloses a method of resizing a given area represented by a five-line staff of sheet music and laying it out so that the resized area represented by a five-line staff width and five-line staff length becomes homothetic to the given area.

Japanese Patent No. 3169142 discloses a method of designating the boundary between parts of sheet music or that between bars, moving the position of the boundary so that the designated boundary coincides with the screen display, and displaying the sheet music.

Japanese Patent Laid-Open Nos. 06-149235 and 06-149236 disclose a method of aligning in the lateral direction the left ends of the five-line staffs of simultaneously played parts in accordance with the coordinates of the top and bottom lines of the five-line staffs of the parts.

Sheet music as a general book describes information for a performance based on rules built up through historical development. Sheet music is not convenient for all players. Therefore, a player edits sheet music so as to easily play for himself by, for example, copying sheet music and dividing it into a plurality of paper sheets so as to allow easy page turning, by coloring sheet music, or by writing signs on it. The editing work optimizes sheet music for the player. However, it is very cumbersome for the player to edit sheet music, so demands have arisen for easy editing of sheet music.

FIG. 24 shows a layout when arranging and printing data from four pages on one paper sheet. The user can designate layouts 1-*a* to 1-*h* via a UI (User Interface). In FIG. 24, reference numeral 1001 denotes an output; 1002, an image corresponding to data of the first page; 1003, an image corresponding to data of the second page; 1004, an image corresponding to data of the third page; and 1005, an image corresponding to data of the fourth page. The layout 1-*a* shows that the image 1002 is arranged at the upper left on the output 1001, the image 1003 is arranged at the lower left, the image 1004 is arranged at the upper right, and the image 1005 is arranged at the lower right.

However, this layout printing simply rearranges images corresponding to respective pages for each page. For example, when the output 1001 is sheet music, visibility sometimes becomes poor.

SUMMARY OF THE INVENTION

The present invention has been made to overcome the conventional drawbacks, and has as its feature to provide an image processing method and image processing apparatus capable of changing the arrangement of the original images of a plurality of pages not for each page but with high degree of freedom and laying them out on one page by simple editing work.

According to an aspect of the present invention, there is provided an image processing method of laying out and outputting an image of an original formed from a plurality of pages on one page. The method includes inputting image data of the original formed from the plurality of pages; dividing the image data input in the inputting into a plurality of blocks; selecting unnecessary information from each block obtained by division in the dividing based on a predetermined rule to maintain continuity of the original formed from the plurality of pages when laying out, on one page, the image data of the original formed from the plurality of pages; discarding the unnecessary information selected in the selecting; appending necessary information to each block obtained by division in the dividing based on the predetermined rule; replacing the respective blocks obtained by division in the dividing with the block from which the unnecessary information is discarded in the discarding, and the block to which the necessary information is appended in the appending; and outputting the respective blocks which have undergone replacement in the replacing by laying out the respective blocks on one page.

According to another aspect of the present invention, there is provided an image processing apparatus which lays out and outputs an image of an original formed from a plurality of pages on one page. The apparatus includes an input unit which inputs image data of the original formed from the plurality of pages; a division unit which divides the image data input by the input unit into a plurality of blocks; a selection unit which selects unnecessary information from each block obtained by division by the division unit based on a predetermined rule to maintain continuity of the original formed from the plurality of pages when laying out, on one page, the image data of the original formed from the plurality of pages; a discard unit which discards the unnecessary information selected by the selection unit; an appending unit which appends necessary information to each block obtained by division by the division unit based on the predetermined rule; a replacement unit which replaces the respective blocks obtained by division by the division unit with the block from which the unnecessary information is discarded by the discard unit, and the block to which the necessary information is appended by the appending unit; and an output unit which outputs the respective blocks which have undergone replacement by the replacement unit by laying out the respective blocks on one page.

According to yet another aspect of the present invention, there is provided a computer-readable medium containing computer-executable instructions utilized in an image processing apparatus configured to lay out and output an image of an original formed from a plurality of pages on one page. Here, the computer-readable medium includes computer-executable instructions for inputting image data of the original formed from the plurality of pages; computer-executable instructions for dividing the image data input in the inputting into a plurality of blocks; computer-executable instructions for selecting unnecessary information from each block obtained by division in the dividing based on a predetermined rule to maintain continuity of the original formed from the plurality of pages when laying out, on one page, the image data of the original formed from the plurality of pages; computer-executable instructions for discarding the unnecessary information selected in the selecting; computer-executable instructions for appending necessary information to each block obtained by division in the dividing based on the predetermined rule; computer-executable instructions for replacing the respective blocks obtained by division in the dividing with the block from which the unnecessary information is discarded in the discarding, and the block to which the necessary information is appended in the appending; and computer-executable instructions for outputting the respective blocks which have undergone replacement in the replacing by laying by laying out the respective blocks on one page.

According to the present invention, when laying out and printing the images of a plurality of pages on one paper sheet, not only the images can be simply rearranged for each page, but also the layout can be changed with high degree of freedom to improve user visibility, thereby printing the images.

Further features of the present invention will become apparent from the following description of exemplary embodiments with reference to the attached drawings.

BRIEF DESCRIPTION OF THE DRAWINGS

FIG. 3 is a schematic perspective view of the outer appearance of an MFP according to an embodiment of the present invention;

FIG. 14 is a flowchart showing an operation sequence in block numbering processing;

FIG. 16 is a view schematically showing numbered divided blocks;

DESCRIPTION OF THE EMBODIMENTS

Various embodiments of the present invention will be described in detail below with reference to the accompanying drawings.

<PC Application>

An embodiment for carrying out the present invention by application software running on a personal computer (to be referred to as a PC hereinafter) serving as a host apparatus will be explained.

Figure 1:
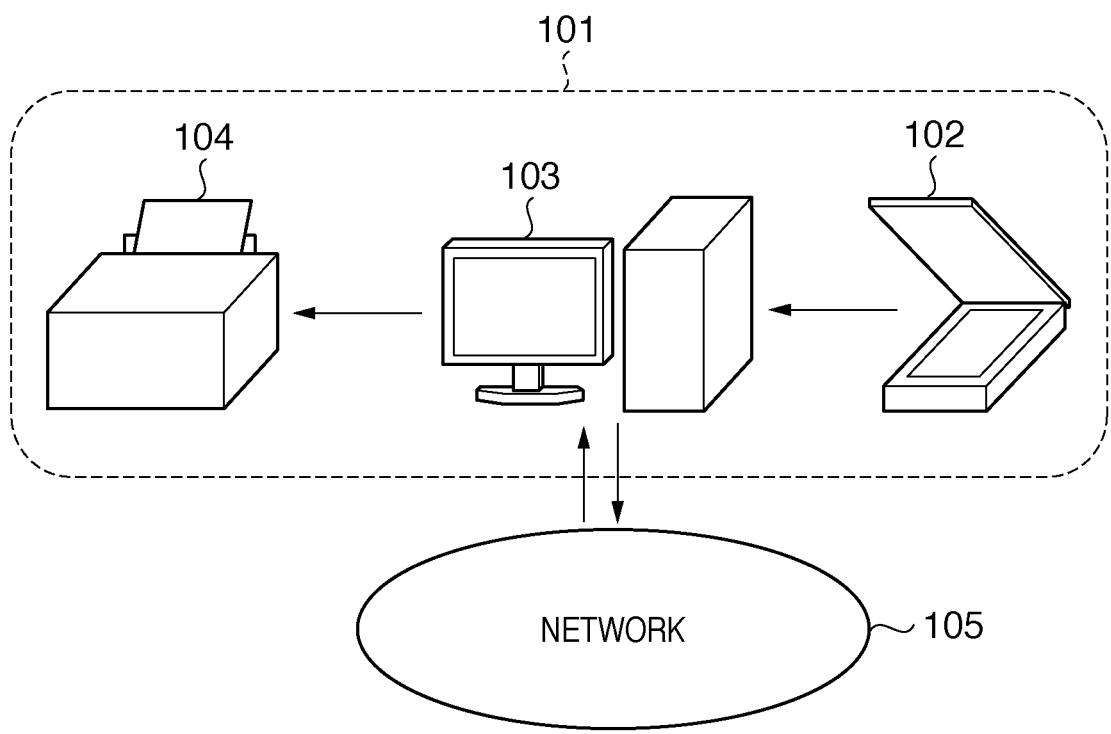
FIG. 1 is a conceptual view showing an example of the configuration of an image processing system including an image processing apparatus according to the present invention.

FIG. 1 is a conceptual view showing an example of the configuration of an image processing system including an image processing apparatus according to the present invention.

An image processing system 101 in FIG. 1 includes a scanner 102 serving as an image reading apparatus, a PC 103, and a printer 104 serving as a printing apparatus. The PC 103 can receive/output image data via a network 105. It is possible to change the layout of sheet music scanned by the scanner 102 and print the resultant sheet music by the printer 104.

Figure 2:
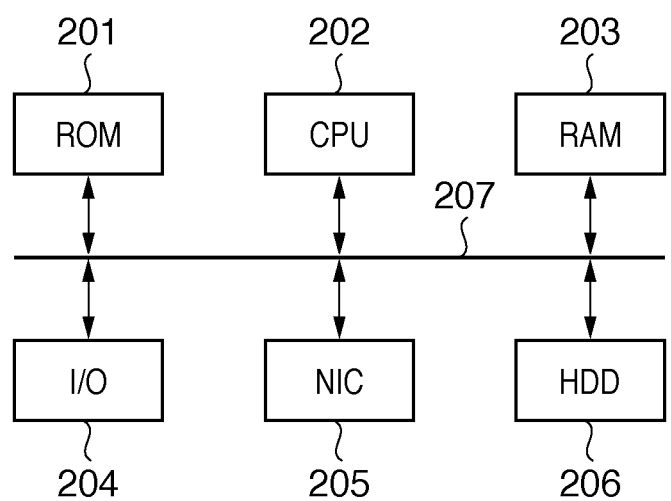
FIG. 2 is a block diagram of the image processing apparatus in FIG. 1.

FIG. 2 is a block diagram of the PC 103 shown in FIG. 1.

In FIG. 2, reference numeral 201 denotes a ROM (Read Only Memory); 202, a CPU (Central Processing Unit); and 203, a RAM (Random Access Memory). Reference numeral 204 denotes an I/O (Input/Output) unit; 205, a NIC (Network Interface Card); 206, an HDD (Hard Disk Drive); and 207, a bus.

The CPU 202 controls the operation of the PC 103 via the bus 207 in accordance with a program and data stored in the ROM 201. At the same time, the CPU 202 performs image processing using the RAM 203 as a work memory. For example, the CPU 202 performs image processing for image data input via the I/O unit 204 or NIC 205, or image data stored in advance in a storage medium such as the HDD 206. The CPU 202 outputs the processed image data via the I/O unit 204 or NIC 205, or stores it in a storage medium such as the HDD 206.

For example, the I/O unit 204 is connected via a predetermined interface to an image input/output device such as a monitor (e.g., CRT or LCD), a printer, or a scanner, or a storage device having a storage medium such as a magnetic disk or optical disk. The I/O unit 204 can receive/output image data via the NIC 205 from/to the above-mentioned image input/output device and a computer device connected to the storage device. Examples of the network are Ethernet, FDDI (Fiber Distributed Data Interface), IEEE1394 serial bus, and USB (Universal Serial Bus).

<MFP>

The same effects as the above-described ones can also be obtained by using an image processing system in which a single multi-function printer (to be referred to as an MFP hereinafter) operates without the mediacy of a PC.

FIG. 3 is a schematic perspective view of the outer appearance of an MFP 301 serving as a multifunctional peripheral according to an embodiment of the present invention. The MFP 301 has the function of a general PC printer which receives data from a PC and prints it, and the function of a scanner. Further, the MFP 301 has, as a function executed by a single MFP, a copy function of printing, by a printer, an image scanned by a scanner, a function of directly reading image data stored in a memory card or the like and printing it, or a function of receiving image data from a digital camera and printing it.

In FIG. 3, the MFP 301 includes a reading unit 302 such as a flat-bed scanner, a printing unit 303 of an inkjet type, electro-photography, or the like, a display unit 304 serving as a display panel, and an operation unit 305 serving as an operation panel having various keys, switches, and the like. A USB port (not shown) is provided on the rear surface of the MFP 301 as a PC interface for communicating with a PC, and enables communication with a PC. In addition to these components, the MFP 301 includes a card interface 306 serving as a card slot for reading out data from a variety of memory cards, and a camera interface 307 serving as a camera port for communicating data with a digital camera. Further, the MFP 301 includes an auto document feeder (to be referred to as an ADF hereinafter) 308 for automatically setting an original onto the original table.

Figure 4:
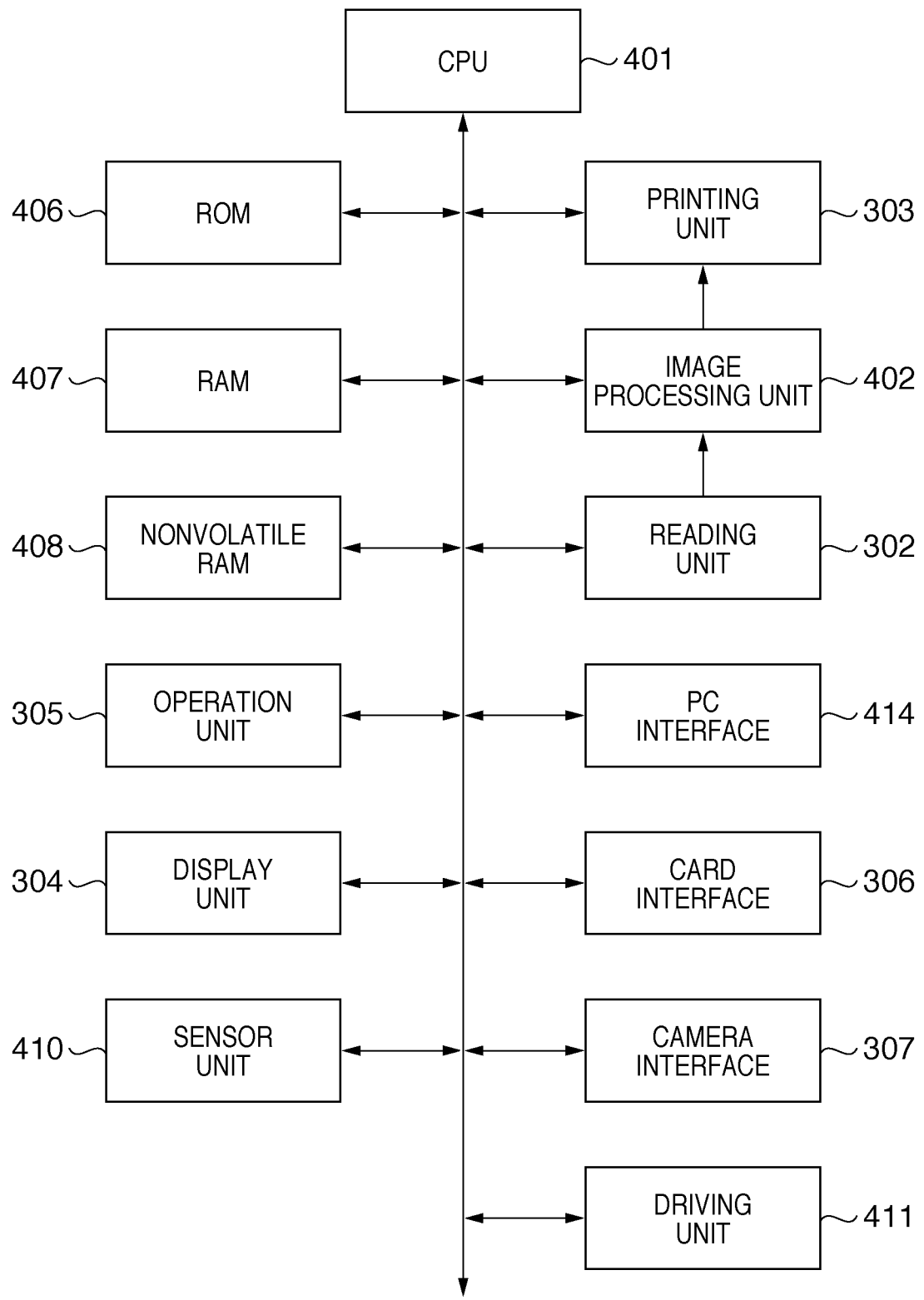
FIG. 4 is a block diagram of the MFP in FIG. 3.

FIG. 4 is a block diagram of the MFP 301 shown in FIG. 3.

In FIG. 4, a CPU 401 controls various functions of the MFP 301, and executes an image processing program stored in a ROM 406 in accordance with a predetermined operation to the operation unit 305.

The reading unit 302 having a CCD reads an original image to output analog luminance data of red (R), green (G), and blue (B). The reading unit 302 may also include a contact image sensor (CIS) instead of the CCD. When the ADF 308 as shown in FIG. 3 is provided, the reading unit 302 can successively read the original images of order sheets set on the ADF 308.

The card interface 306 receives, in accordance with a predetermined operation to the operation unit 305, image data captured by a digital camera or the like and recorded on a memory card or the like. If necessary, an image processing unit 402 converts image data received via the card interface 306. For example, the image processing unit 402 converts image data corresponding to the color space (e.g., YCbCr) of a digital camera into one corresponding to the RGB color space (e.g., NTSC-RGB or sRGB). If necessary, the received image data undergoes various processes necessary for an application, such as resolution conversion into an effective pixel count based on header information of the image data.

A camera interface 307 is directly connected to a digital camera to read image data.

The image processing unit 402 performs image processes (to be described later) such as image analysis, calculation of the conversion characteristic, conversion from a luminance signal (RGB) into a density signal (CMYK), scaling, gamma conversion, and error diffusion. Data obtained by these image processes are stored in a RAM 407. When corrected data stored in the RAM 407 reach a predetermined amount necessary to print by the printing unit 303, the printing unit 303 executes a print operation.

A nonvolatile RAM 408 is, for example, a battery backed-up SRAM, and stores data unique to the MFP 301 and the like.

The operation unit 305 has a photo direct print start key to select image data stored in a storage medium and start printing, a key to print an order sheet, and a key to read an order sheet. The operation unit 305 also has a copy start key to perform monochrome copying or color copying, a mode key to designate a mode such as resolution or image quality in copying, a stop key to stop a copy operation or the like, a numeric keypad to input the number of copies, a registration key, and the like. The CPU 401 detects the pressed states of these keys, and controls each unit in accordance with the states.

The display unit 304 includes a dot matrix type liquid crystal display (LCD) and LCD driver, and presents various displays under the control of the CPU 401. The display unit 304 displays the thumbnail of image data stored in a storage medium.

The printing unit 303 includes an inkjet head of an inkjet type, general-purpose IC, and the like. The printing unit 303 reads out print data stored in the RAM 407, and prints it out as a hard copy under the control of the CPU 401.

A driving unit 411 includes a stepping motor for driving feed and delivery rollers in the operations of the reading unit 302 and printing unit 303, a gear for transmitting the driving force of the stepping motor, and a driver circuit for controlling the stepping motor.

A sensor unit 410 includes a sensor for detecting the width of a print medium, a sensor for detecting the presence/absence of a print medium, a sensor for detecting the width of an original image, a sensor for detecting the presence/absence of an original image, and a sensor for detecting the type of print medium. Based on pieces of information obtained from these sensors, the CPU 401 detects the states of an original and print medium.

A PC interface 414 is an interface between the PC and the MFP 301. The MFP 301 executes operations such as printing and scanning based on instructions transmitted from the PC via the PC interface 414.

In copying, image data of an original image read by the reading unit 302 is processed in the MFP 301, and printed by the printing unit 303. When the user designates a copy operation via the operation unit 305, the reading unit 302 reads an original set on the original table. Image data of the read original image is transmitted to the image processing unit 402, and undergoes image processing (to be described later). The processed image data is transmitted to the printing unit 303, and printed.

Figure 5:
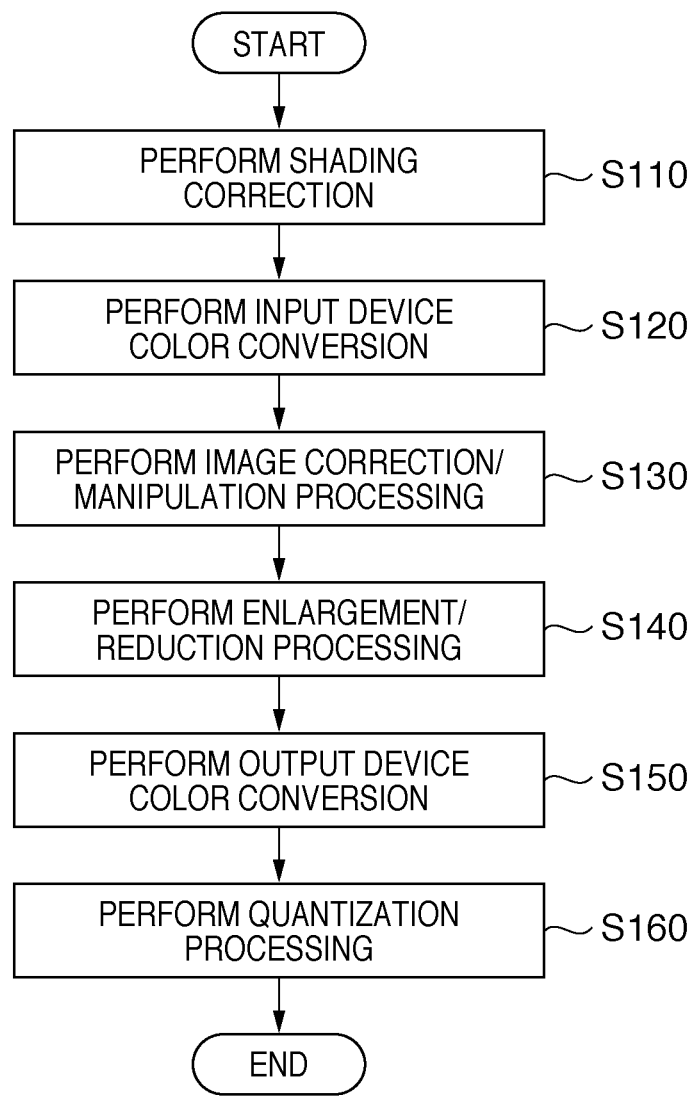
FIG. 5 is a flowchart of image processing executed in copying.

FIG. 5 is a flowchart of image processing executed in copying. Respective steps will be explained, but a detailed description of steps which are not essential to the present invention will be omitted.

In step S110, image data which is read by the reading unit 302 and A/D-converted undergoes shading correction to correct variations of image sensors.

In step S120, the image data undergoes input device color conversion to convert image data corresponding to a color space unique to the reading unit 302 serving as an input device into image data corresponding to a standard color space. More specifically, the image data is converted into image data corresponding to a color space such as sRGB defined by IEC (International Electrotechnical Commission) or AdobeRGB proposed by Adobe Systems. The conversion method is, for example, an arithmetic method based on a 3×3 or 3×9 matrix, or a look-up table method of looking up to a table describing a conversion rule and determining a resultant value based on the table.

In step S130, the image data having undergone color conversion undergoes image correction/manipulation processing. The processing contents include edge emphasis processing of correcting blurring generated upon reading an original image, processing of removing offset generated upon reading by light irradiation, and character manipulation processing for improving character readability.

In step S140, enlargement/reduction processing is executed to convert the image data at a desired ratio when the user designates resizing or in layout copying of laying out two original sheets on one paper sheet. The conversion method is generally a bicubic method, nearest neighbor method, or the like. When laying out and printing a plurality of images on one print medium in layout copying or the like, the operations in steps S110 to S140 are repeated to read a plurality of images and lay out the read images on one page. Then, the process shifts to the following print operation.

In step S150, the image data corresponding to the standard color space is converted into image data corresponding to a color space unique to an output device. Similar to step S120, the conversion method suffices to be the arithmetic method based on a matrix or the look-up table method. Image data corresponding to the color space unique to the output device is converted into one corresponding to the color space of the colors of inks used in an MFP 301 of inkjet type, such as cyan, magenta, yellow, and black.

In step S160, the image data undergoes quantization processing. For example, when an ink dot is expressed by a binary value representing whether or not to discharge an ink dot, the image data suffices to be binarized according to a quantization method such as error diffusion. As a result, the image data is converted into a data format printable by the printing unit. The print operation is executed based on the image data of this data format, forming an image.

First Embodiment

Figure 6:
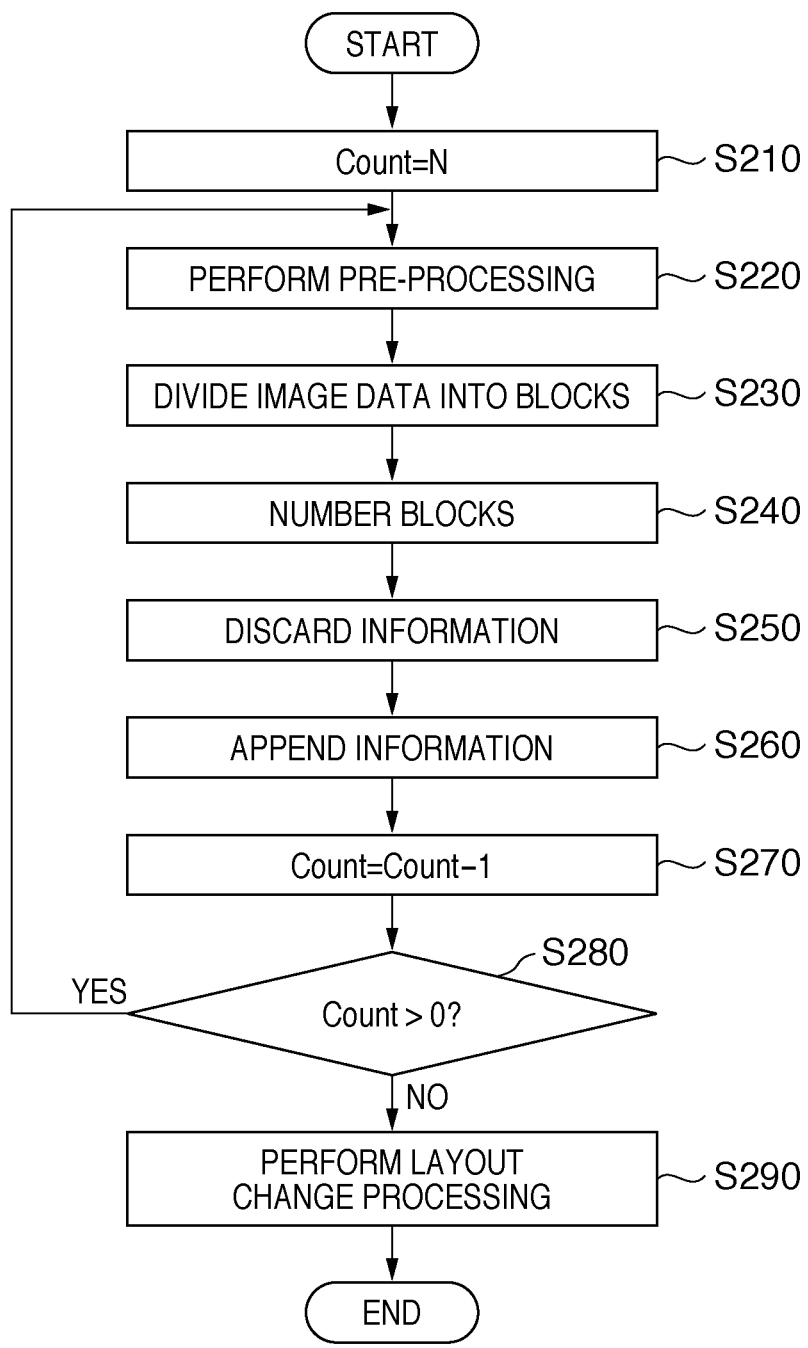
FIG. 6 is a flowchart showing the operation sequence of an image processing method according to the present invention.

A first embodiment of the present invention will be described below referring to the drawings. FIG. 6 is a flowchart showing the operation sequence of an image processing method according to the present invention.

First, in step S210, the number N of pages of original images that is designated for layout by the user using an operation unit 305 of an MFP 301 or the like is substituted as a Count value.

Figure 7:
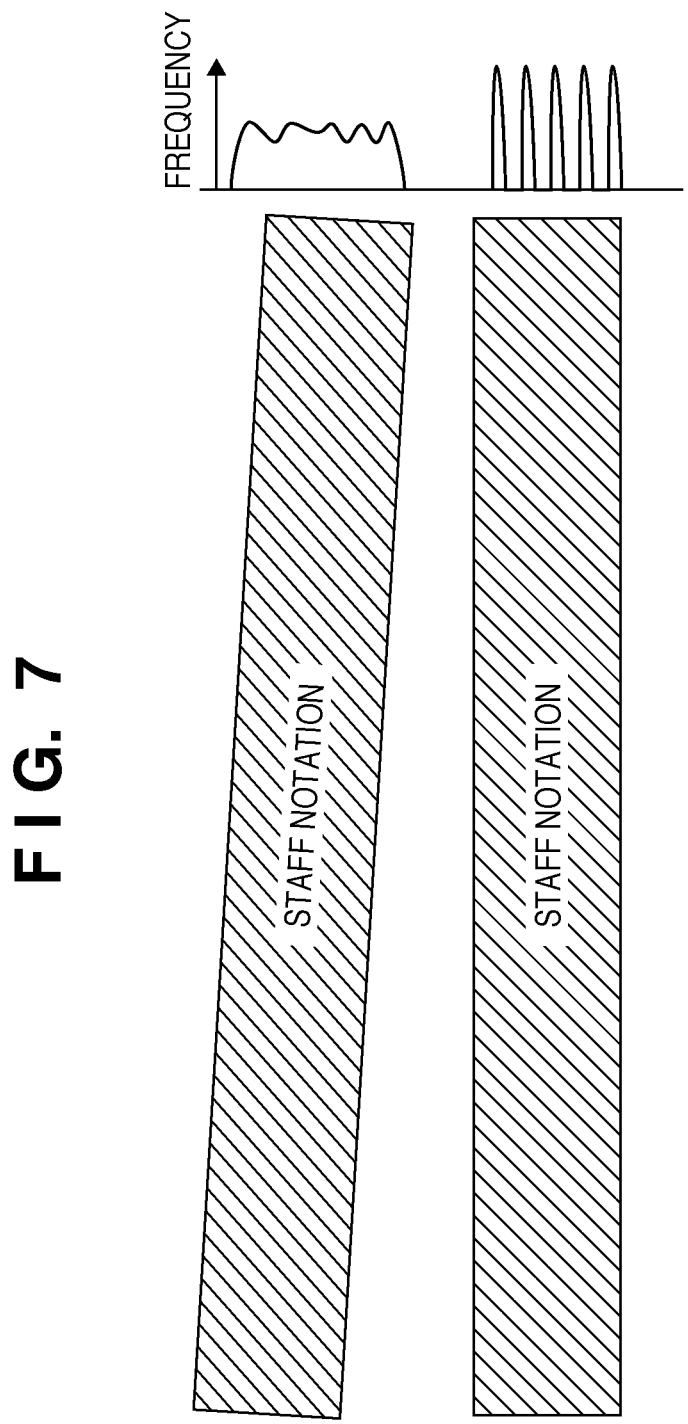
FIG. 7 is a view for explaining skew correction of an original image.

Then, in step S220, image data of one page of an original image undergoes pre-processing. As the pre-processing, skew correction of an original image is executed first. This is because the reading device may read an original image with a skew. When the original image is sheet music, skew correction suffices to use a method of correcting a skew using a five-line staff of the sheet music. For example, the image density of read sheet music is calculated at a plurality of angles to create a histogram, as shown in FIG. 7. When the angle is parallel to the staff, the histogram draws steep curves at portions corresponding to the five lines of the five-line staff. From this, an angle at which the five-line staff becomes parallel to the reading direction is calculated, and the entire image is rotated and corrected. If necessary, a binarization operation may also be done using a threshold. Although a fixed threshold may also be used, the threshold may also be calculated after creating a brightness histogram when the highest image density of an original image changes between pages or the image density of a margin on an original changes between pages. Filtering processing may also be done to thicken the thin lines of a five-line staff and hook, improving their reproducibility. The reference position of the original image is determined using five-line staff information in the skew-corrected image data.

Figure 8:
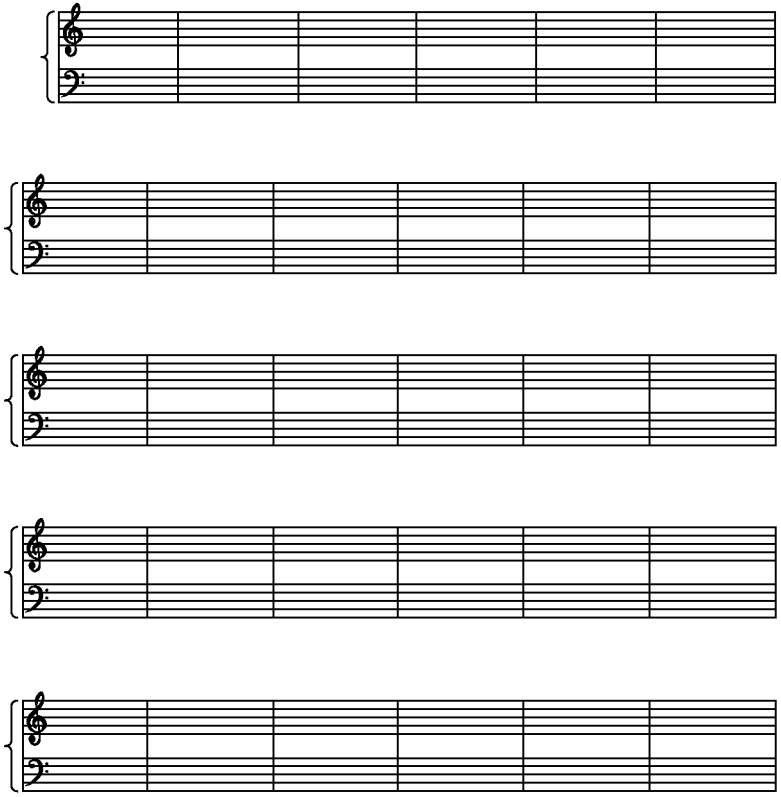
FIG. 8 is a view schematically showing the original image of sheet music.
Figure 9:
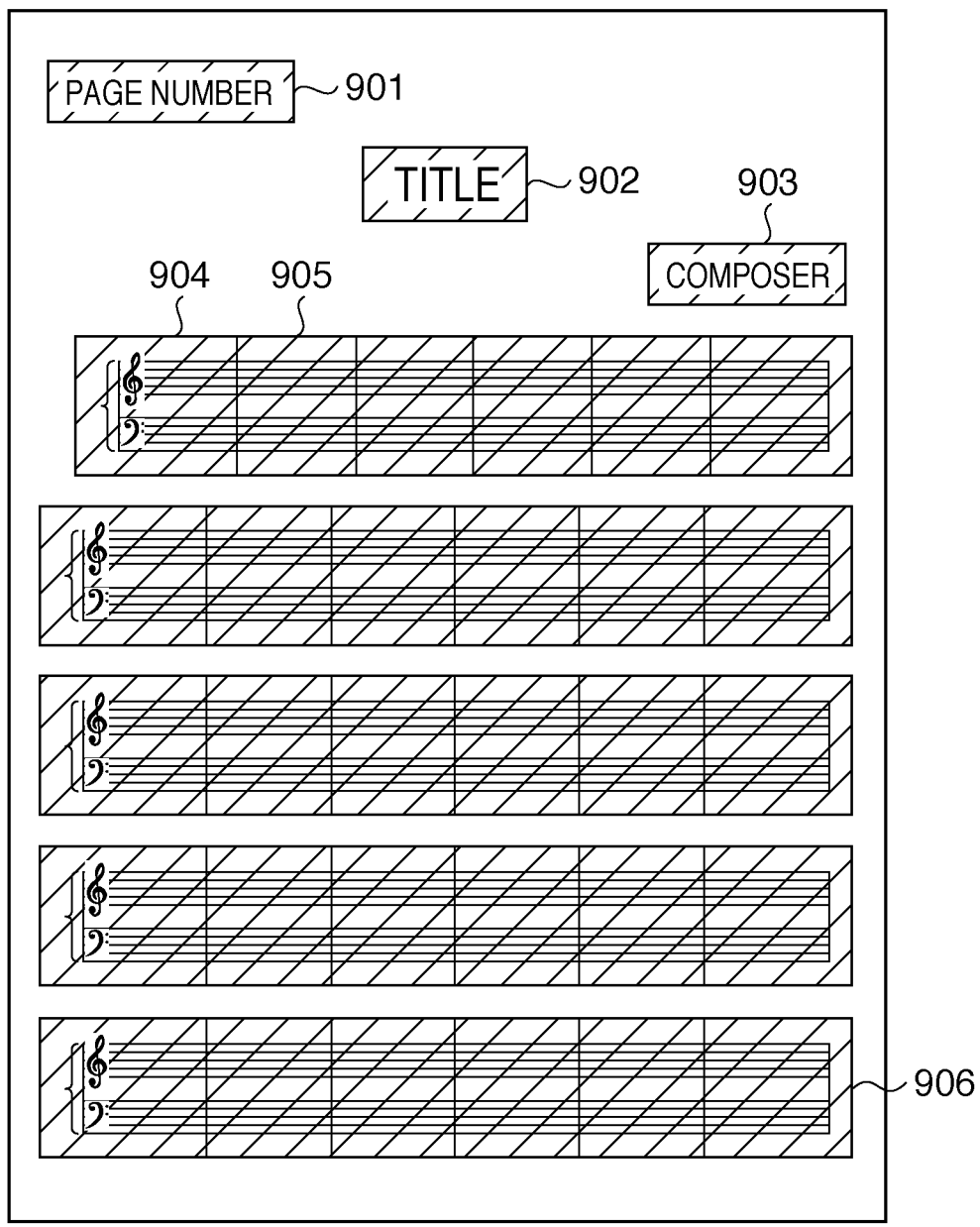
FIG. 9 is a view schematically showing the result of dividing the original image of sheet music into blocks.

In step S230, the image data of the original image is divided into a plurality of rectangular blocks. In this step, image area separation is executed to separate the image into at least three types of attributes "text part", "natural image part", and "background part". Each separated image is divided into rectangular blocks for each attribute. For example, when the original image expressed by the image data having undergone pre-processing in step S220 is an original image in FIG. 8, the original image divided into rectangular blocks for respective attributes "text part" and "background part" by image area separation is as shown in FIG. 9. Since the original image is sheet music, it is divided into blocks for respective bars. The bar line of a bar is a straight line perpendicular to the five-line staff. Such straight lines are detected, and the original image is divided into areas defined by the detected straight lines. As a result, the original image can be divided into blocks for respective bars.

Figure 10:
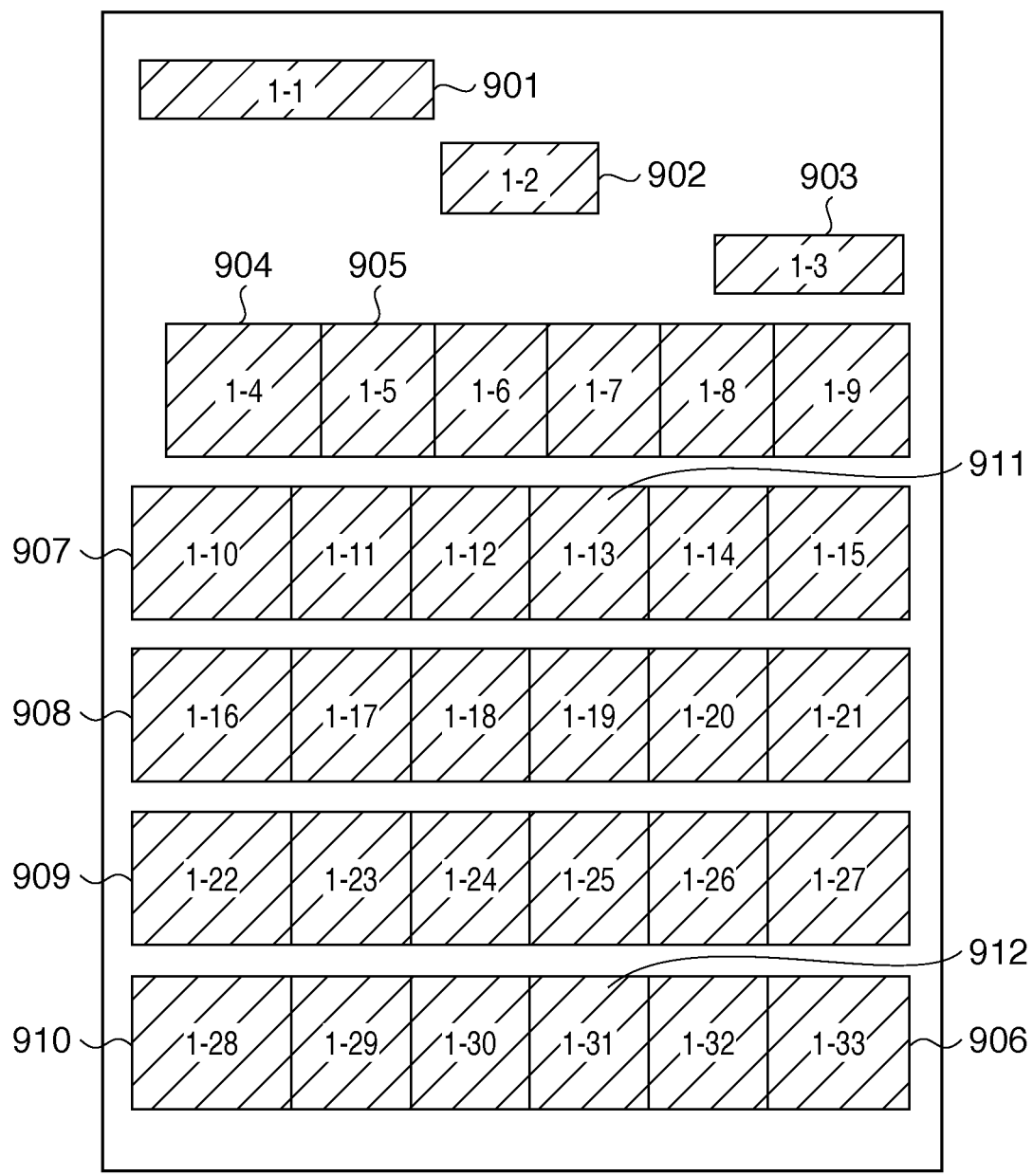
FIG. 10 is a view schematically showing the result of numbering blocks.

In step S240, the divided rectangular blocks are numbered based on a rule made in advance to maintain the original continuity of a plurality of pages. In this step, the respective rectangular blocks of a 1-page original image are numbered in ascending order from an upper left block toward a lower right block. FIG. 10 shows the result of numbering on the original image divided into rectangular blocks in FIG. 9. The rectangular blocks are numbered sequentially from the upper left. A block 901 is numbered with "1-1", a block 902 is numbered with "1-2", a block 903 is numbered with "1-3", a block 904 is numbered with "1-4", a block 905 is numbered with "1-5", and a block 906 is numbered with "1-33". A block 907 is numbered with "1-10", a block 908 is numbered with "1-16", a block 909 is numbered with "1-22", a block 910 is numbered with "1-28", a block 911 is numbered with "1-13", and a block 912 is numbered with "1-31". When the original image is sheet music, it is divided into blocks for the page number, title, composer, great staffs, bars, and the like. The coordinates of each block in the original image of one page is obtained, and the block is numbered in accordance with the coordinates.

Figure 11:
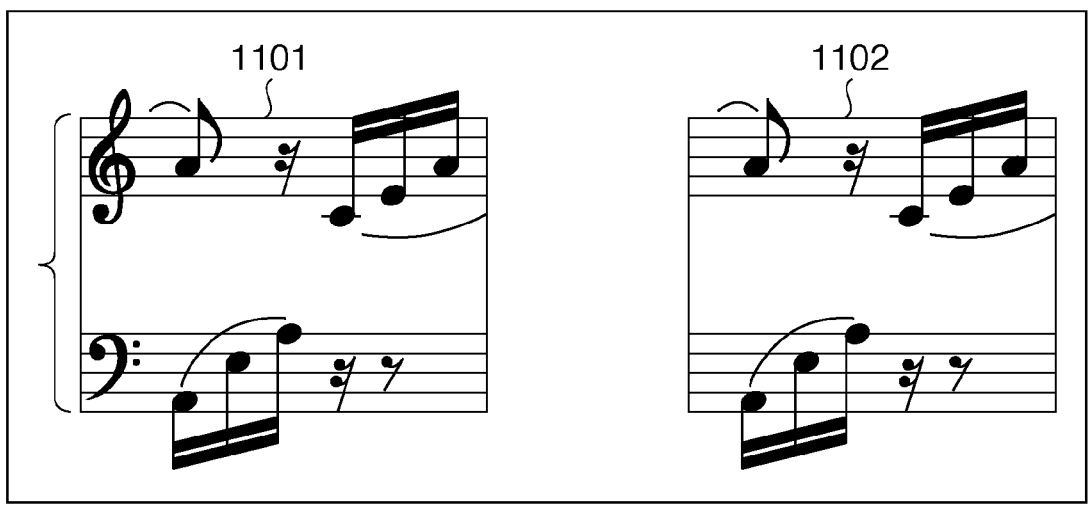
FIG. 11 is a view showing an example of discarding unnecessary information.
Figure 13:
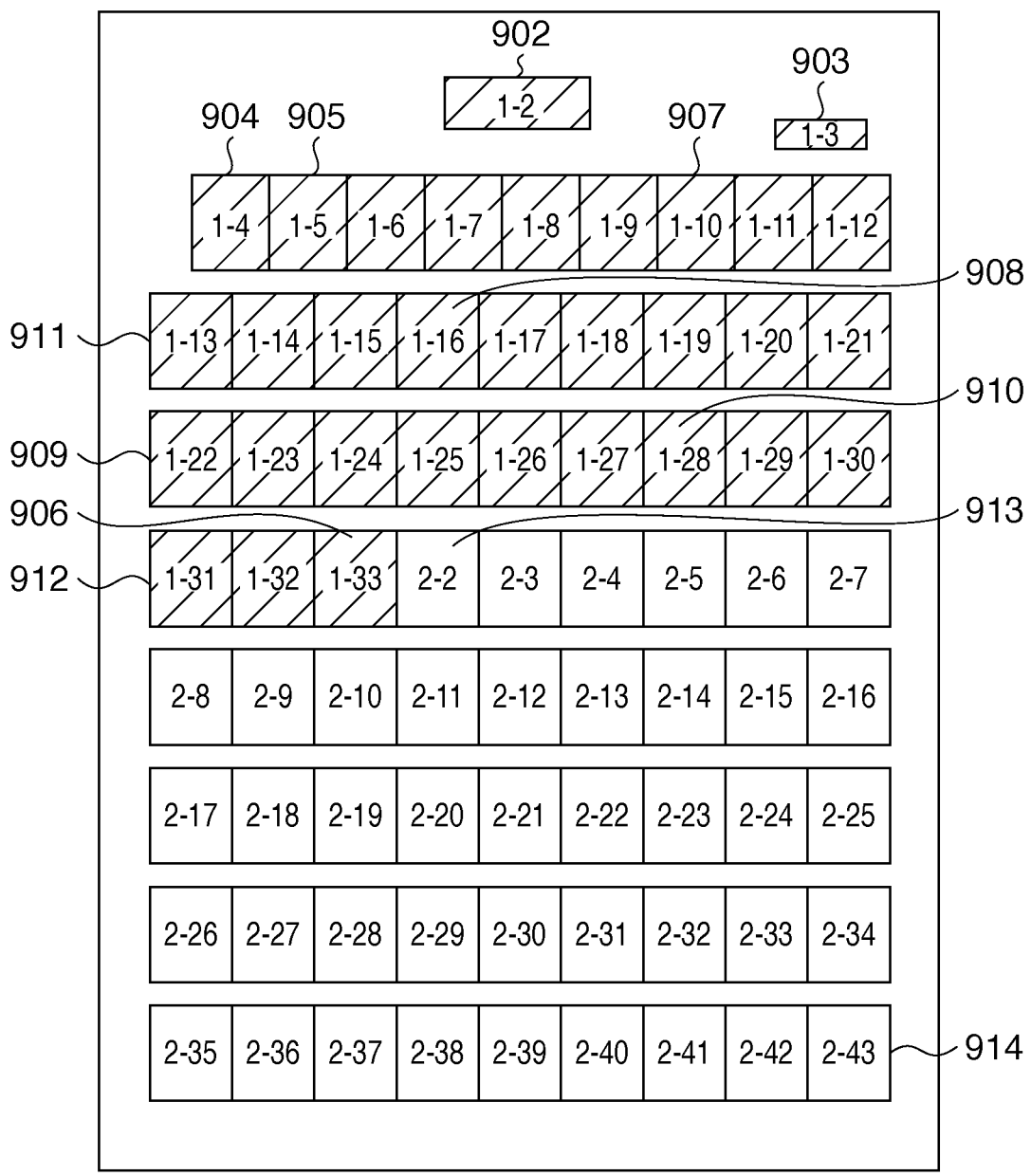
FIG. 13 is a view schematically showing the result of executing layout printing according to the present invention.

Next, in step S250, information which becomes unnecessary in layout is selected based on the rule made in advance to maintain the original continuity of a plurality of pages and, block-level information as well as some information contained within a block are discarded. For example, when the original images of a plurality of pages are divided into blocks and blocks are laid out on one page according to the present invention, the page number of an original image is unnecessary information. Thus, information of the block 901 in FIG. 10 is discarded. Sheet music is expressed by great staffs, each of which combines treble and bass staffs using a brace. At the beginning of a great staff, a brace, G clef, and F clef are described. A case where the original images of two pages are laid out and printed on one page will be exemplified. The sheet music of FIG. 8 as the original image of the first page includes five great staffs each made up of six bars. The original image of the second page includes a page number, and seven great staffs each made up of six bars. The second page is divided into block "2-1" of a page number, and blocks "2-2" to "2-43" of respective bars. In layout according to the first embodiment, as represented by a schematic layout shown in FIG. 13, each great staff includes nine bars. Before the layout change, the blocks 907, 908, and 910 are positioned at the beginnings of respective great staffs, as shown in FIG. 10. After the layout change, these blocks move from the beginnings of great staffs, as shown in FIG. 13. For this reason, braces, G clefs, and F clefs in these blocks become unnecessary. FIG. 11 shows an example of an image from which a brace, G clef, and F clef which become unnecessary in a block are discarded. A bar 1101 represents a bar at the beginning of a great staff. A bar 1102 represents a bar from which a brace, G clef, and F clef which become unnecessary in a block are discarded. A brace, G clef, and F clef are positioned at the beginning of a great staff, and thus always contained in a block at the left end. A brace, G clef, and F clef can be detected by executing pattern matching in a block.

Figure 12:
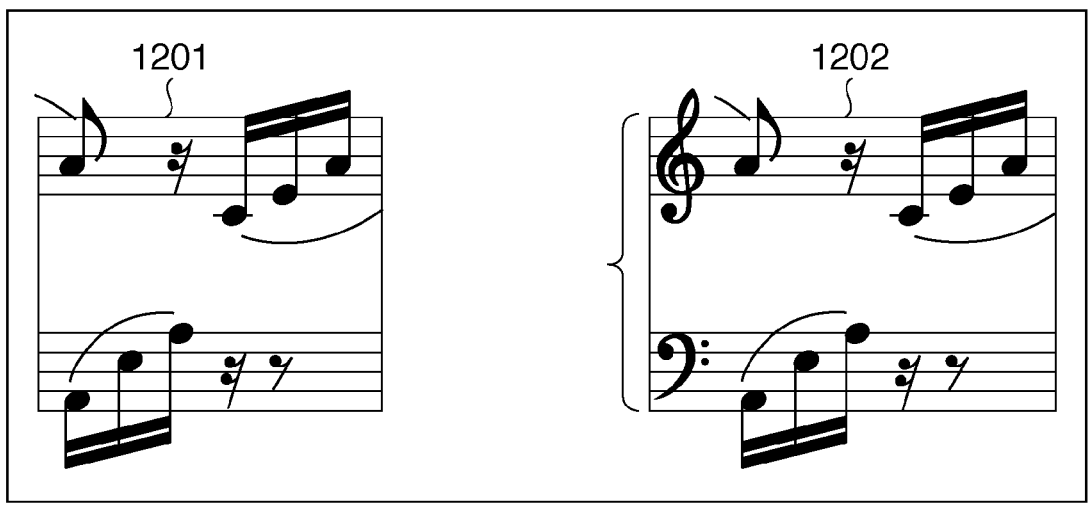
FIG. 12 is a view showing an example of appending necessary information.

In step S260, information which becomes necessary in layout is appended based on the rule made in advance to maintain the original continuity of a plurality of pages. As described above, a brace, G clef, and F clef are necessary at the beginning of a great staff. After the layout change, the blocks 911 and 912 move to the beginnings of great staffs, and require braces, G clefs, and F clefs. FIG. 12 shows an example of an image to which a brace, G clef, and F clef which become necessary in a block are appended. A bar 1201 represents a bar which does not appear at the beginning of a great staff. A bar 1202 represents a bar to which a brace, G clef, and F clef which become necessary in a block are appended. Necessary information suffices to be appended in accordance with sheet music after layout change by storing image data of necessary information such as a brace, G clef, and F clef in advance in the memory of the MFP 301.

The Count value is decremented in step S270, and it is determined in step S280 whether the Count value has reached 0. If it is determined that the Count value has not reached 0 (YES in step S280), steps S220 to S270 are repeated for the original image of the next page. If it determined that the Count value has reached 0 (NO in step S280), the process advances to step S290.

In step S290, the layout of numbered rectangular blocks is changed in accordance with a user instruction regarding the number of blocks to be laid out. As described above, FIG. 13 is a view schematically showing a layout when laying out and printing the original images of two pages on one page. Blocks numbered with "1-2" to "1-33" are laid out from the original image of the first page. Blocks from a block 913 numbered with "2-2" to a block 914 numbered with "2-43" are laid out from the original image of the second page (not shown). These blocks are those replaced with blocks to and from which information is discarded and appended in steps S250 and S260.

In the first embodiment, the layout of sheet music of two pages including 6-bar great staffs is changed into sheet music of one page including 9-bar great staffs. The number of bars of each great staff after layout change is uniquely determined by the number of sheet music pages to be laid out into 1-page sheet music, the number of great staffs, and the number of bars of one great staff. It is, therefore, preferable to calculate in advance the number of bars of each great staff after layout change.

The interval between the treble and base staffs of each great staff is not constant, and the width of a bar is not constant. Thus, it is desirable to resize each block in layout so as to make the treble and base staffs match each other.

Accordingly, even when laying out and printing a plurality of pages on one paper sheet, a printed material with good visibility can be created.

Second Embodiment

A second embodiment of the present invention will be described below referring to the drawings. In the first embodiment, the original image is sheet music having a fixed format. In the second embodiment, the original image is a document having no fixed format.

FIG. 14 is a flowchart showing an operation sequence in block numbering processing in step S240 of FIG. 6.

Figure 15:
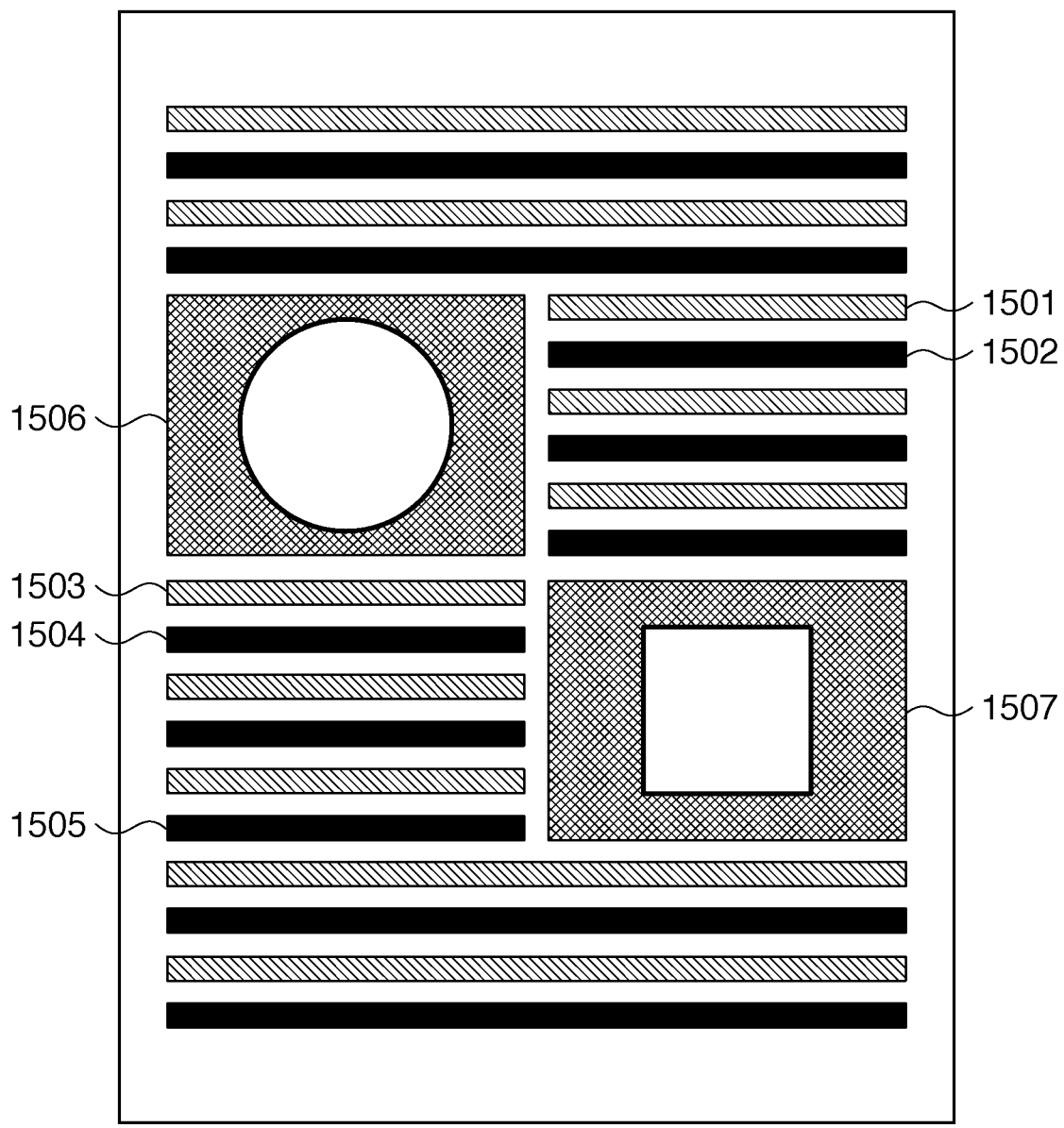
FIG. 15 is a view showing the original image of one page.
Figure 17:
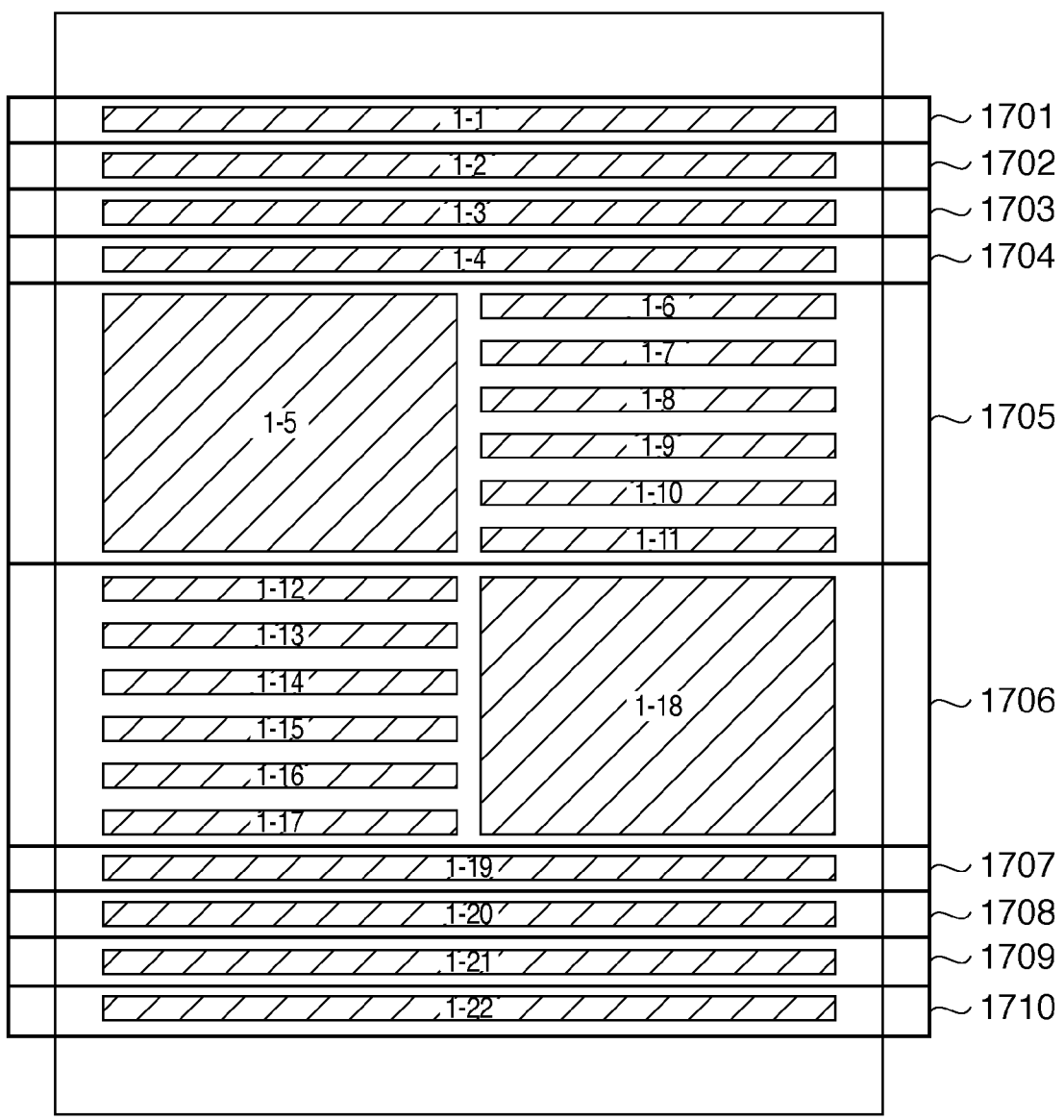
FIG. 17 is a view schematically showing an example of grouping blocks.

First, in step S310, grouping processing is executed to group blocks divided in step S230 of FIG. 6. The grouping processing is for dividing an original image in the longitudinal direction at breaks between blocks in the longitudinal direction, thereby combining blocks into a plurality of groups each including one or a plurality of blocks. A concrete example of the grouping processing will be explained with reference to FIGS. 15 to 17. FIG. 15 shows the original image of one page. Reference numerals 1501, 1502, 1503, 1504, and 1505 schematically denote texts; and 1506 and 1507, objects such as a graph, figure, and natural image. FIG. 16 is a view schematically showing numbered blocks obtained by dividing the original image of FIG. 15 into blocks by the method described in the first embodiment. FIG. 17 shows the result of grouping the blocks of FIG. 16. The blocks are combined into 10 groups 1701 to 1710.

Figure 18:
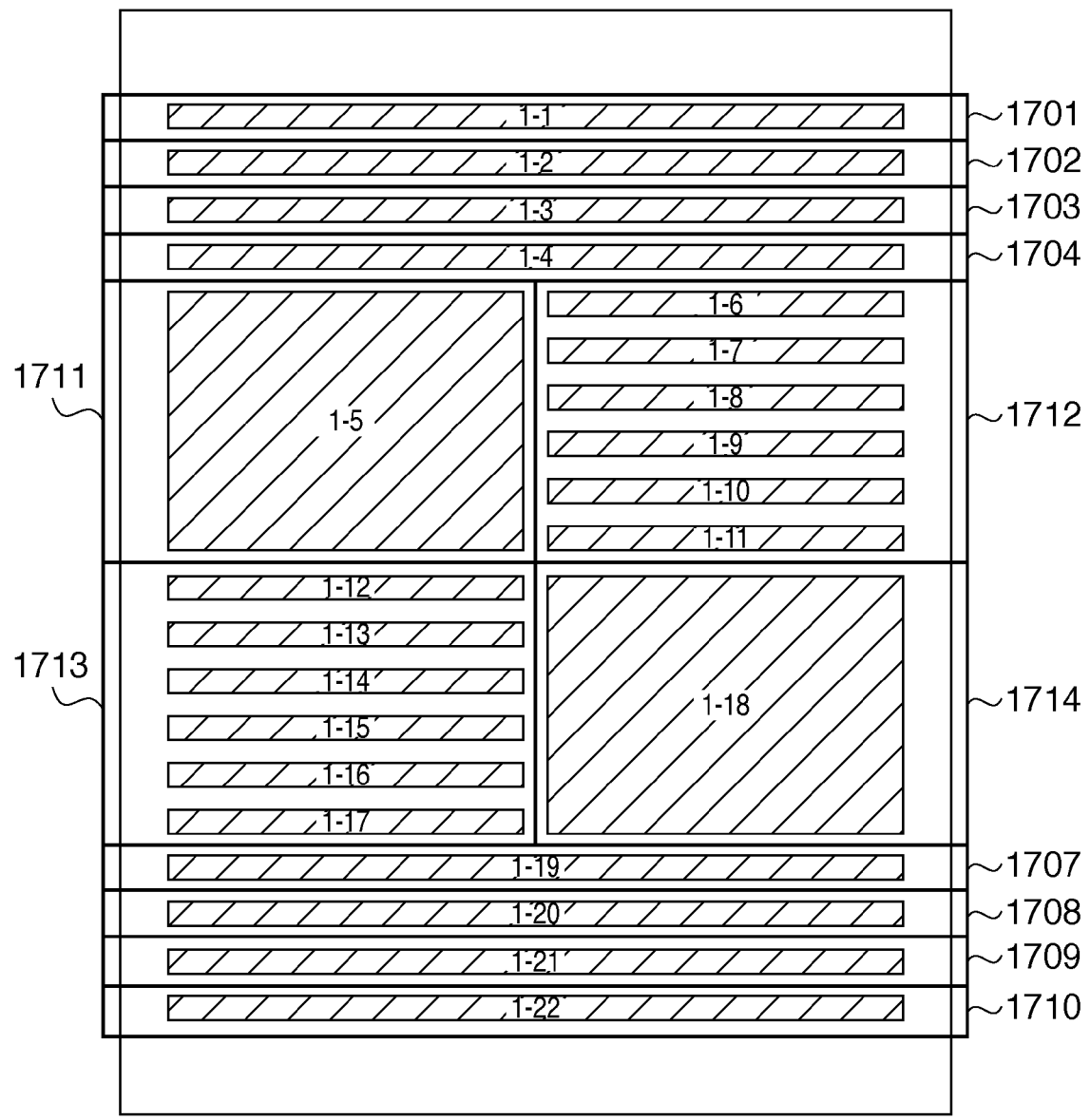
FIG. 18 is a view for explaining group division processing.
Figure 22:
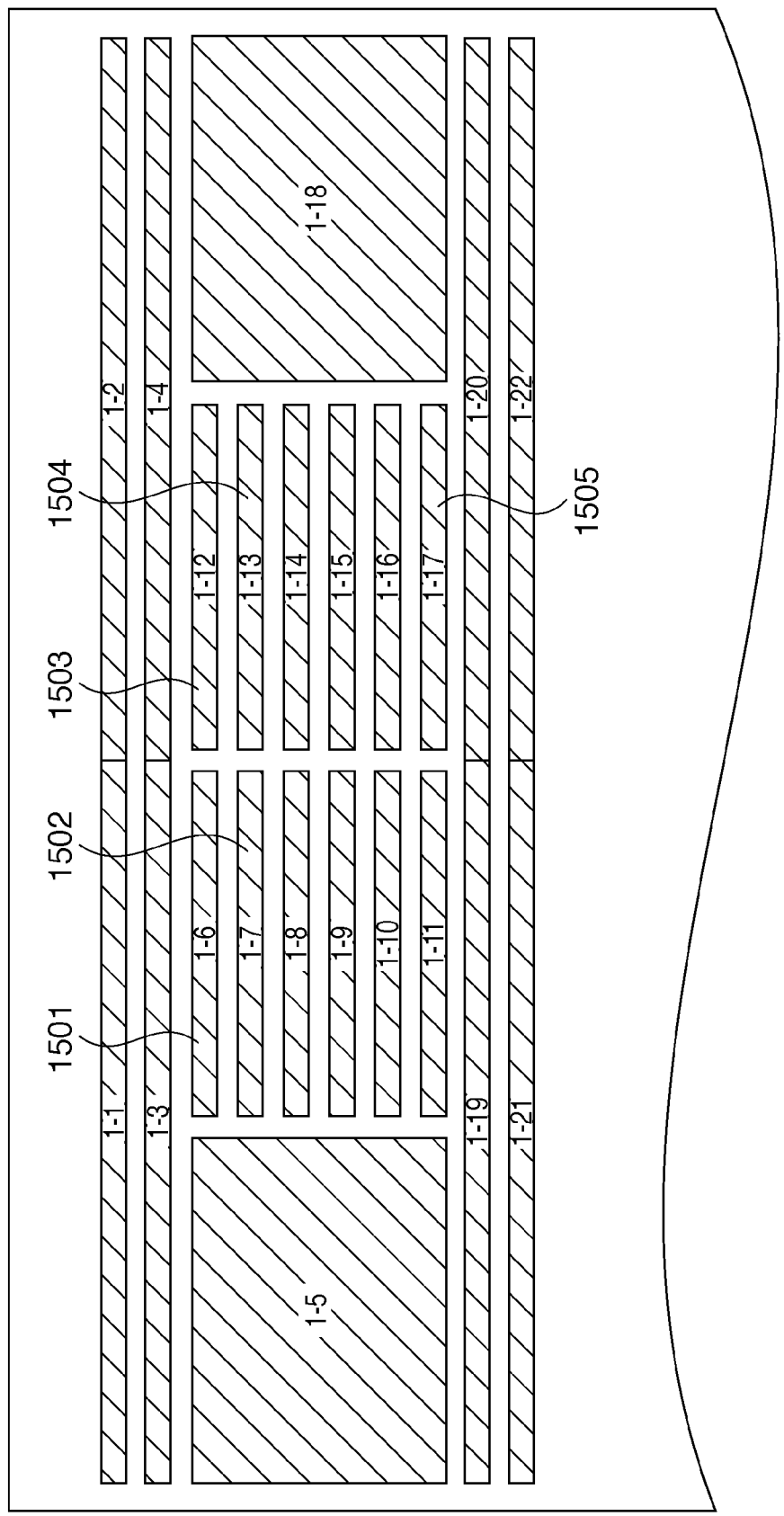
FIG. 22 is a view schematically showing a layout result for performing layout printing.
Figure 23:
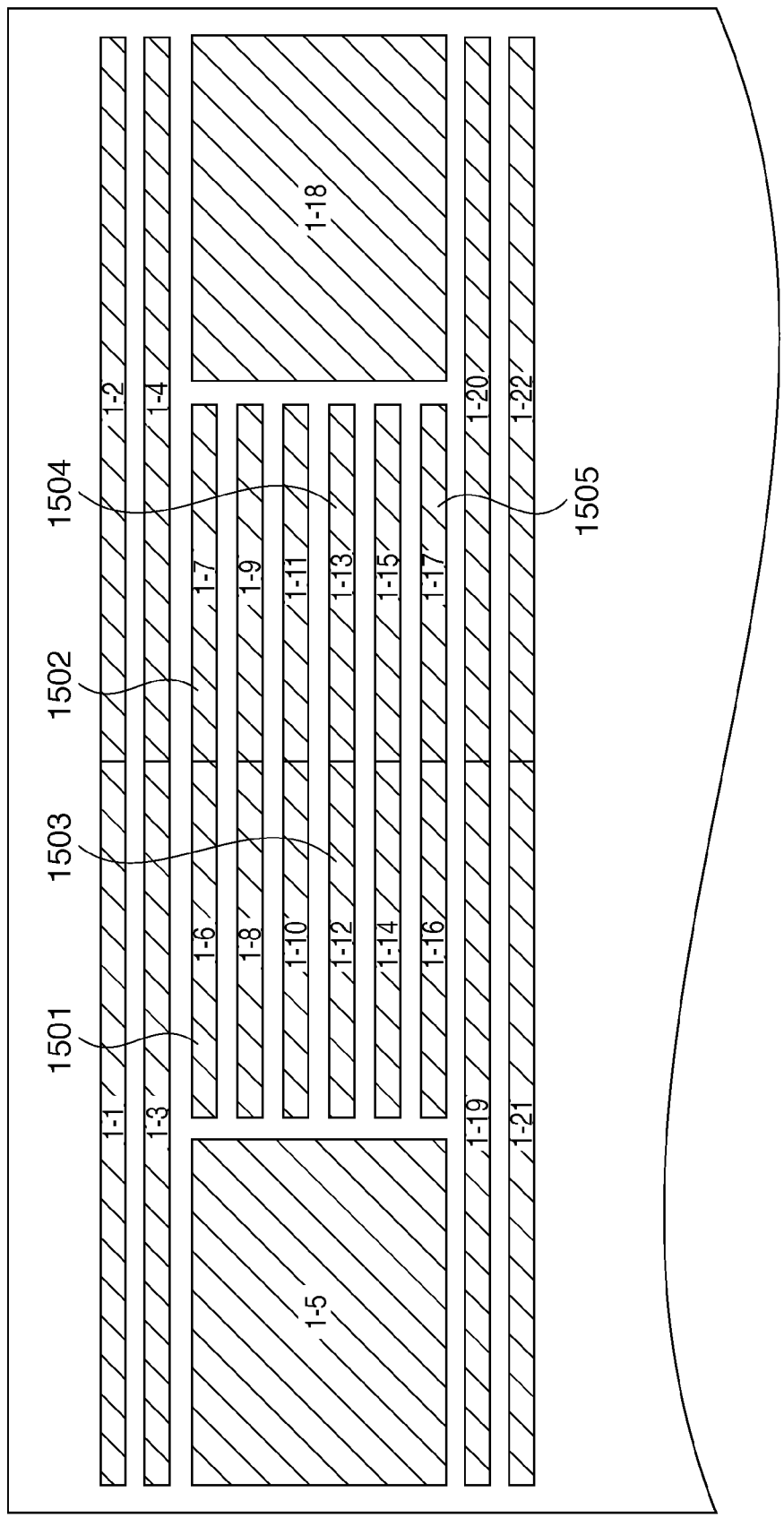
FIG. 23 is a view schematically showing a layout result for performing layout printing.
Figure 24:
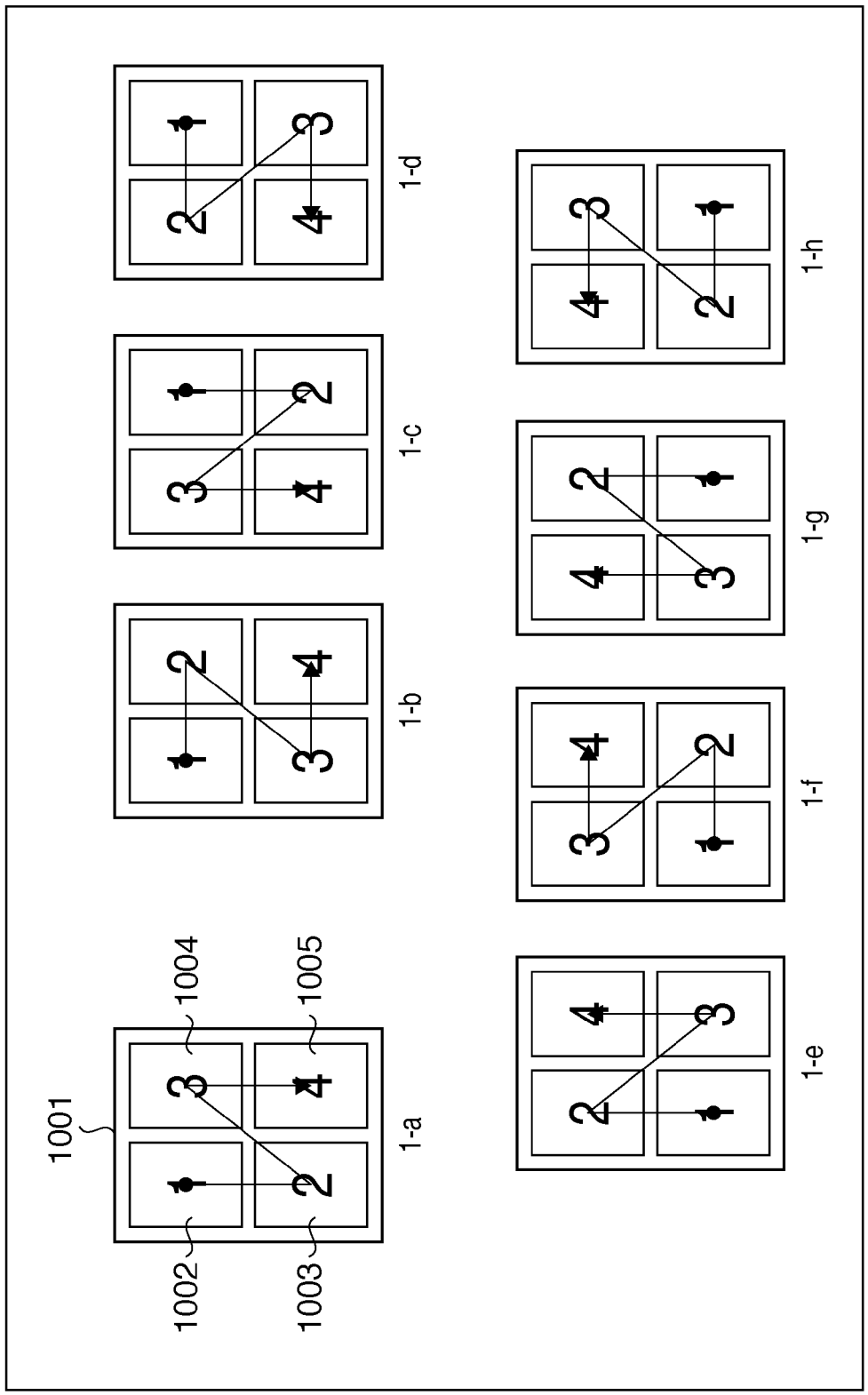
FIG. 24 is a view showing layouts for layout printing.

Then, in step S320, group division processing is executed to divide a group. The group division processing is to divide a group in the lateral direction at a break between blocks in the lateral direction in a group made up of a plurality of blocks among groups. A concrete example of the group division processing will be explained with reference to FIG. 18. FIG. 18 shows an original image obtained by dividing, into groups, an original image having undergone grouping as shown in FIG. 17. The group 1705 in FIG. 17 is divided into groups 1711 and 1712. The group 1706 is divided into groups 1713 and 1714. An example of laying out these groups is shown in FIG. 22 or 23 to be described in the third embodiment.

Figure 19:
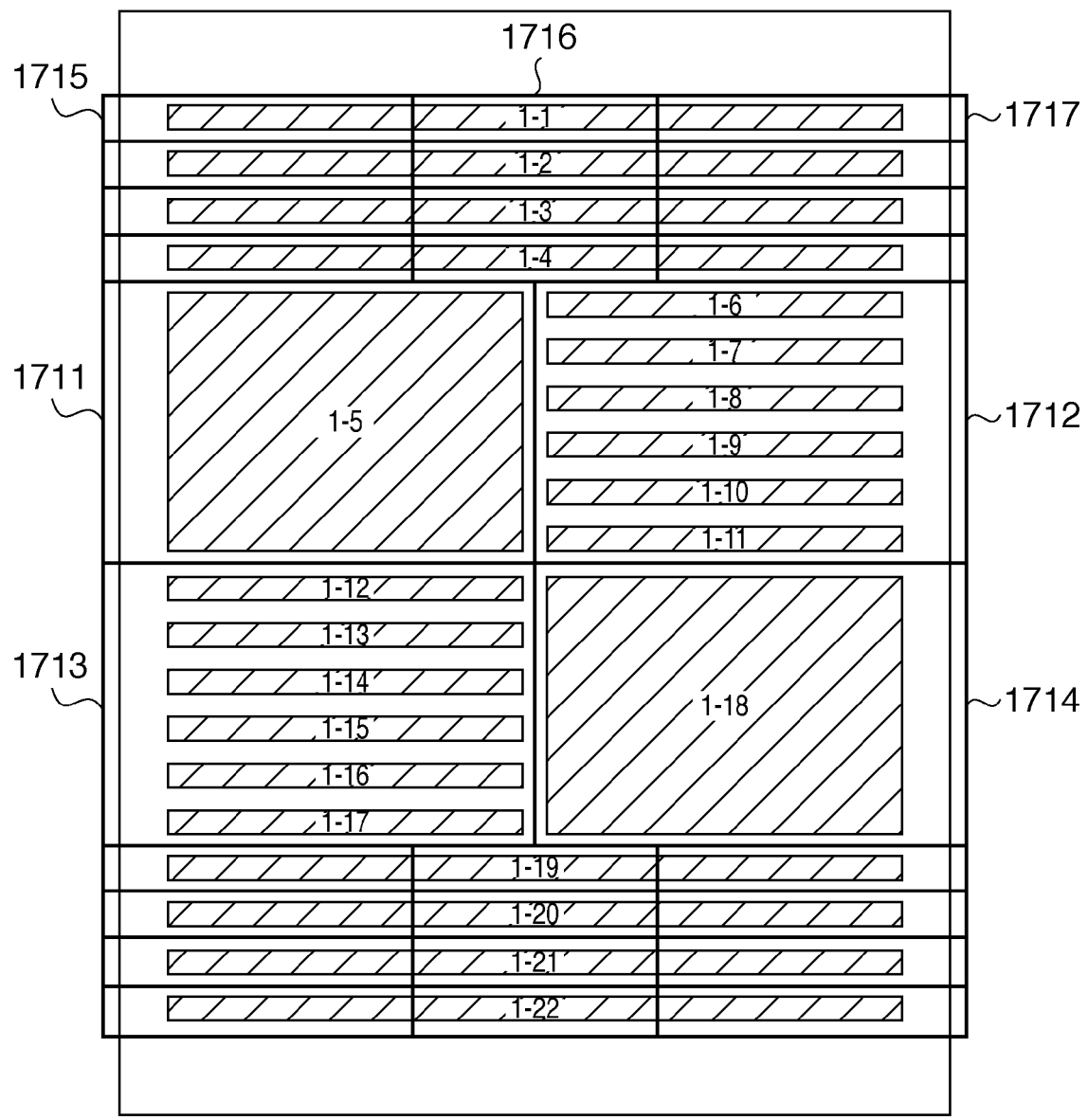
FIG. 19 is a view showing an original image in which blocks of the text part in the original image are divided.

In step S330, a block separated as the "text part" in step S230 of FIG. 6 is divided based on the number of pages of the original image used in layout printing. The text can be laid out in multiple columns by dividing a block separated as the "text part" into a plurality of blocks and rearranging them. In contrast, if a block separated as the "natural image part", which is an image other than the text, is divided and rearranged, the image becomes meaningless. FIG. 19 shows an example of dividing a block of the "text part" when laying out and printing two pages on one paper sheet. FIG. 19 shows an original image obtained by dividing a block of the text part in an original image having undergone group division processing as shown in FIG. 18. A block 1715 (1-1 left), a block 1716 (1-1 center), and a block 1717 (1-1 right) in FIG. 19 are obtained by dividing the group 1701 of the "text part" in FIG. 18 in accordance with the number of pages to be laid out. In this case, the original images of two pages are laid out and printed on one page. However, the block is divided into three to fit the page width when changing the scaling ratio of each block and arranging the block.

Figure 25:
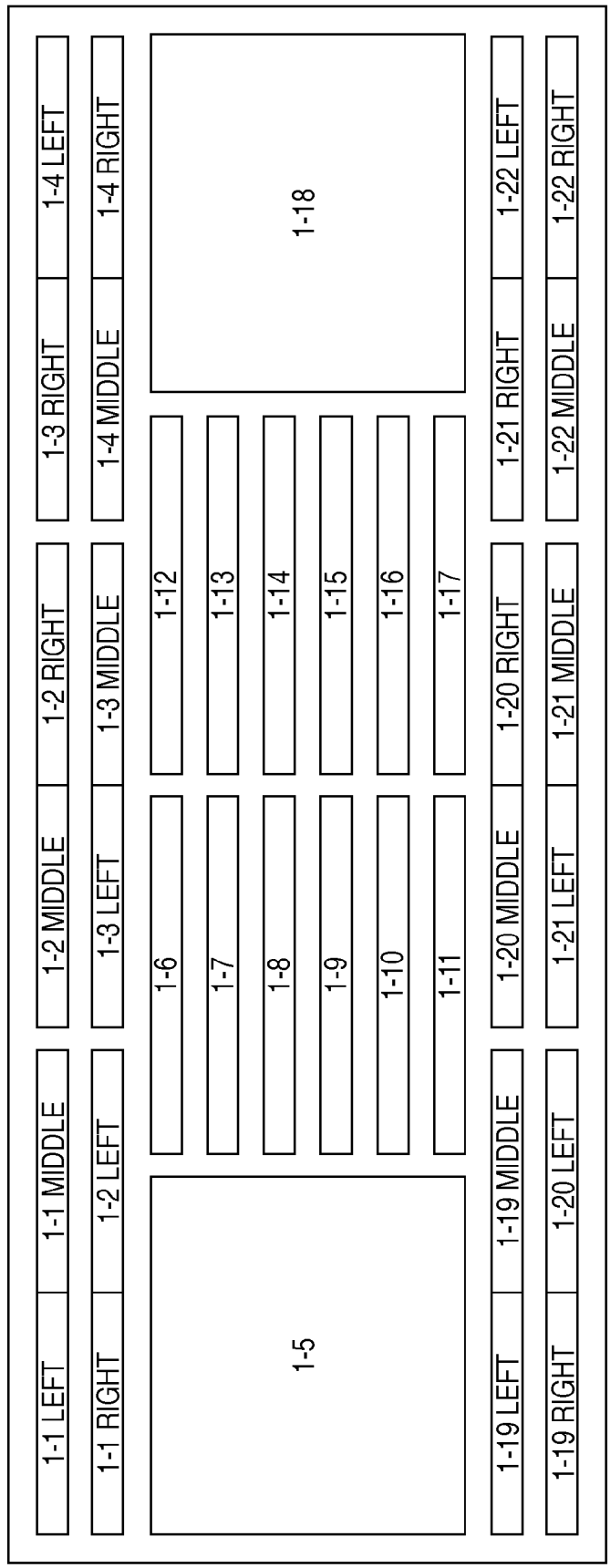
FIG. 25 is a view schematically showing a layout result for performing layout printing.

According to the same procedure, each of the groups 1702, 1703, 1704, 1707, 1708, 1709, and 1710 of the "text part" in FIG. 18 is similarly divided into three blocks. FIG. 25 shows the layout of these blocks. In FIG. 25, each of the groups 1702, 1703, 1704, 1707, 1708, 1709, and 1710 of the "text part", each of which is divided into three blocks, is laid out in three columns while maintaining the continuity of the text. This layout improves the readability of the "text part", compared with the layouts in FIGS. 22 and 23.

In this fashion, blocks are divided based on the result of image area separation. Even when laying out and printing an original image having no fixed format, like a document created by a PC or a Web page, a printed material with good visibility can be generated. The second embodiment is directed to a case where neither information which becomes unnecessary in layout nor information which becomes necessary in layout is detected. For example, when an original image contains a page number, the page number of the original image can be regarded as unnecessary information to exclude the page number from the layout.

Third Embodiment

Figure 20:
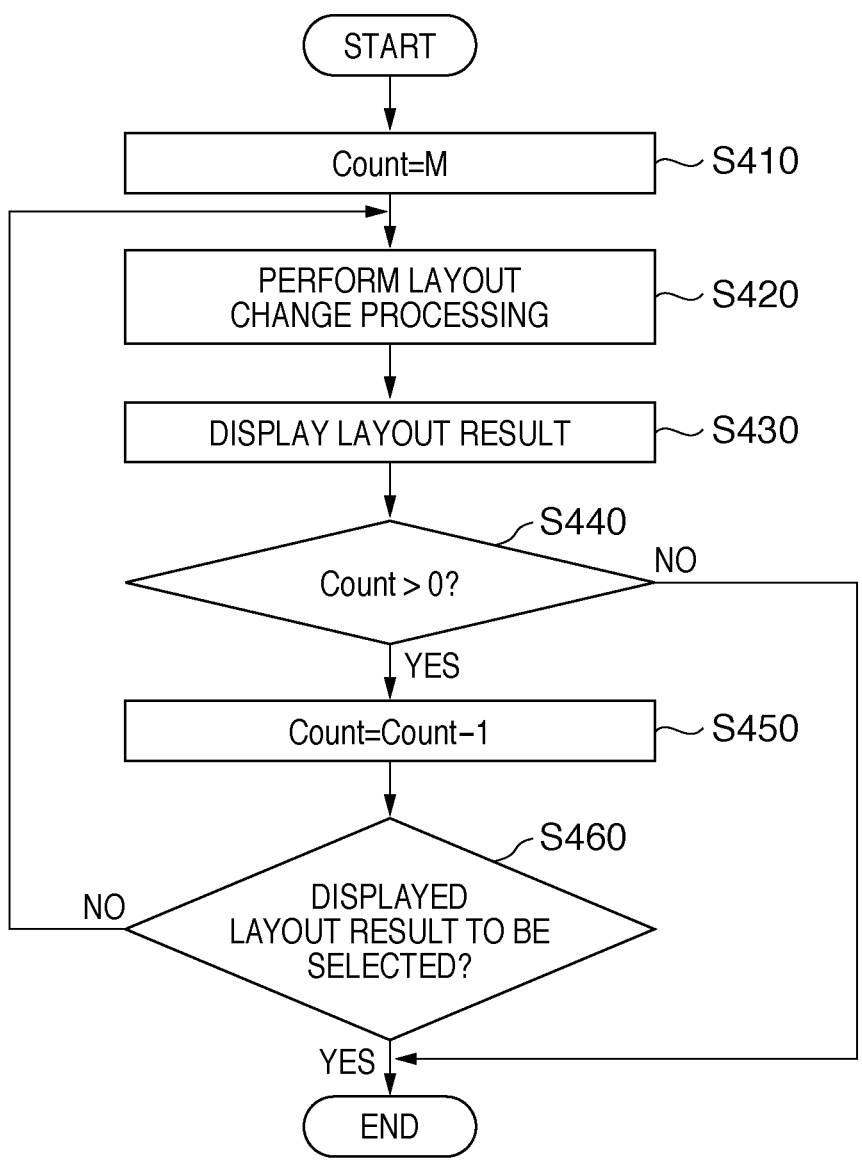
FIG. 20 is a flowchart showing a processing sequence to display a layout result and determine a layout.

A third embodiment of the present invention will be described below referring to the drawings. FIG. 20 is a flowchart showing a processing sequence to display a layout result and determine a layout.

Figure 21:
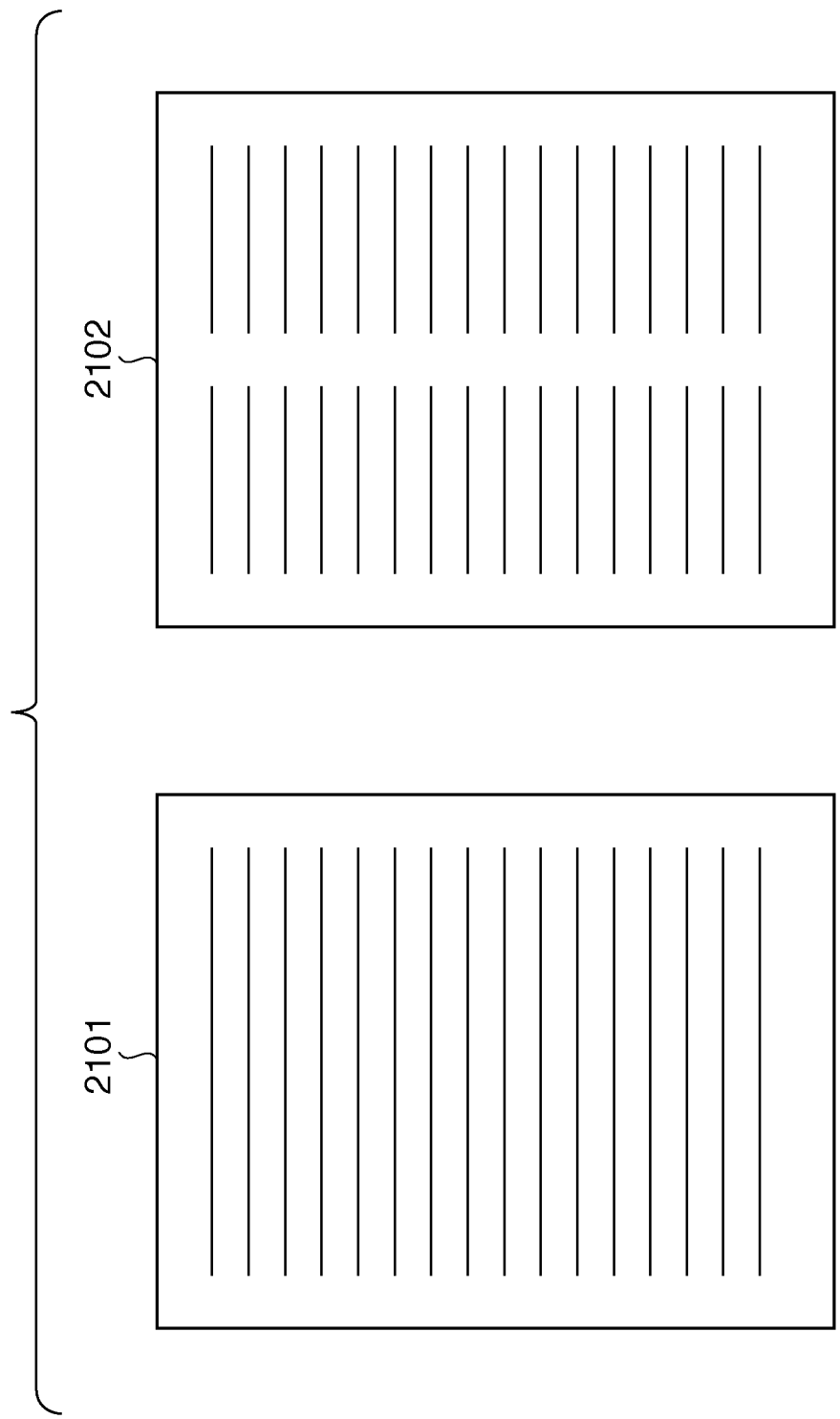
FIG. 21 is a view schematically showing the columns of a text.

When laying out and printing the original images of a plurality of pages on one page according to the present invention, an optimal layout differs depending on the user. For example, as for the text layout as shown in FIG. 21, a user may feel that a layout 2101 of one column is preferable, but another user may feel that a layout 2102 of two columns is preferable. The present invention does not simply rearrange a plurality of pages, so an infinite number of layouts are conceivable. It is difficult to automatically provide a layout optimal for each user from an infinite number of layouts. Thus, a means for presenting a plurality of layouts to a user, and prompting him to select a layout optimal for him from these layouts is required.

First, in step S410, a count M which is determined in accordance with a user instruction and at which the layout result is displayed is set as a Count value.

Then, in step S420, layout change processing is done. The layout change processing is, for example, layout change processing in step S290 of FIG. 6. One layout is selected from a plurality of conceivable layouts based on a predetermined algorithm, and the current layout is changed to the selected one. When the count at which the layout result is displayed is set to two or more in step S410, the predetermined algorithm is set to select a different layout every time the process shifts to this step.

In step S430, the layout result changed in step S420 is displayed.

In step S440, it is determined whether the layout result display count has reached the count set by the user in step S410. If the layout result display count has reached this count (NO in step S440), the layout result is displayed, and the processing for determining a layout ends. If the layout result display count has not reached this count (YES in step S440), the process advances to step S450. When the layout result is displayed and the processing for determining a layout ends, conventional layout printing of laying out and printing an original image for each page is executed.

In step S450, the Count value is decremented, and the process advances to step S460.

In step S460, the user determines whether to employ the layout displayed in step S430. If the user determines via a UI to select the layout result (YES in step S460), the layout result is selected, and the process ends. If the user does not select the layout result (NO in step S460), the process returns to step S420.

An example of a layout result displayed in step S430 of FIG. 20 when laying out and printing the original images of four pages on one paper sheet will be explained with reference to FIGS. 22 and 23. A page layout method is the same between the original images of four pages, so the layout method for the first page will be described. Assume that the original image of the first page is the original image in FIG. 15.

In FIG. 16 schematically showing numbered blocks, assume that unnecessary information is discarded and necessary information is appended based on layout information of FIGS. 22 and 23.

FIG. 22 shows an example of a layout result displayed in step S430 of FIG. 20. This layout result is obtained by laying out blocks based on the layout rule in the second embodiment. FIG. 23 shows an example of a layout result different from that in FIG. 22, which is displayed because the user does not select the layout in FIG. 22. This layout result is obtained by laying out some blocks of the "text part" based on a layout rule different from that in the second embodiment. The difference between FIGS. 22 and 23 is the difference in how to lay out blocks 1501 to 1505. The blocks 1501 to 1505 are laid out in a different way based on an image area separation result representing that all the blocks 1501 to 1505 are determined as the "text part" in block conversion.

As described above, when dividing a plurality of pages into blocks and laying out the blocks again, an infinite number of layouts are available. An optimal layout differs depending on the user. For this reason, a plurality of layout rules are prepared. The user is presented with layout results processed based on these layout rules, and prompted to select a layout optimal for him. As a result, an optimal layout result can be provided.

Other Embodiments

The present invention is also carried out by supplying the program codes of software for implementing the functions of the above-described embodiments to, for example, an apparatus connected to various devices, and operating these devices in accordance with programs stored in the computer of the apparatus or the like.

In this case, the program codes of the software implement the functions of the above-described embodiments, and the program codes themselves and means such as a storage medium for supplying the program codes to a computer constitute the present invention. Concrete examples of the storage medium are a flexible disk, hard disk, optical disk, magnetooptical disk, CD-ROM, magnetic tape, nonvolatile memory card, and ROM.

The present invention includes program codes when the functions of the above-described embodiments are implemented by executing the program codes supplied to the computer. The present invention also includes program codes when the functions of the above-described embodiments are implemented by an OS (Operating System) and another application software or the like running on the computer in cooperation with each other.

The functions of the above-described embodiments are also implemented when program codes supplied to the computer are stored in the memories of a function expansion board and function expansion unit of the computer, and, for example, the CPUs of the function expansion board and function expansion unit execute processing based on the instructions of the program codes. The present invention also incorporates these program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331071, filed on Dec. 21, 2007, which is hereby incorporated by reference herein in its entirety.

What is claimed is:

1. A method performed in an image processing apparatus which includes a processor and memory that executes the following method steps comprising:
   inputting data of an original music score;
   specifying a plurality of blocks in the music score based on the data input in the inputting, and specifying a first block arranged at a line-start position in the original music score from the plurality of blocks;
   discarding information required for the line-start position from the specified first block;
   deciding a second block which is not arranged at a line-start position in the original music score but which is newly arranged at a line-start position after a layout of the original music score is changed;
   appending the information required for the line-start position to the decided second block;
   changing the layout of the original music score so that the decided second block is arranged at the line-start position and the first block is arranged at a position different from the line start-position, continuity of the original music score is maintained; and
   outputting a music score which was produced as a result that the original music score has undergone the discarding, the appending and the changing.

2. The method according to claim 1, wherein the specifying specifies bars in a great staff of the music score.

3. The method according to claim 2, wherein the appending appends at least one of, a G clef, and an F clef.

4. The method according to claim 1, wherein the inputting inputs image data of the original music score.

5. The method according to claim 1, further comprising determining a number of pages of the input original music score;
   wherein the deciding decides the second block, according to the number of pages determined in the determining.

6. The method according to claim 4, wherein the outputting includes:
   displaying the music score which was produced as a result that the original music score has undergone the discarding, the appending, and the changing.

7. An image processing apparatus comprising:
   a processor and memory;
   an input unit which inputs data of an original music score;
   a specifying unit which specifies a plurality of blocks in the music score based on the data input by the input unit, and specifying a first block arranged at a line-start position in the original music score from the plurality of blocks;
   a discarding unit for discarding information required for the line-start position from the specified first block;
   a deciding unit which decides a second block which is not arranged at a line-start position in the original music score but which is newly arranged at a line-start position after a layout of the original music score is changed;
   an appending unit which appends information required for the line-start position to the decided second block;
   a changing unit which changes the layout of the original music score so that the decided second block is arranged at the line-start position and the first block is arranged at a position different from the line start-position, continuity of the original music score is maintained; and
   an output unit which outputs a music score which was produced as a result that the original music score has undergone the discarding, the appending and the changing.

8. A non-transitory computer-readable medium containing computer-executable instructions utilized in an image processing apparatus, the computer-readable medium comprising:
   computer-executable instructions for inputting data of an original music score;
   computer-executable instructions for specifying a plurality of blocks in the music score based on the data input in the inputting, and specifying a first block arranged at a line-start position in the original music score from the plurality of blocks;
   computer-executable instructions for discarding information required for the line-start position from the specified first block;
   computer-executable instructions for deciding a second block which is not arranged at a line-start position in the original music score but which is newly arranged at a line-start position after a layout of the original music score is changed;
   computer-executable instructions for appending the information required for the line-start position to the decided second block line-start position;
   computer-executable instructions for changing the layout of the original music score so that the decided second block is arranged at the line-start position and the first block is arranged at a position different from the line start-position, continuity of the original music score is maintained; and
   computer-executable instructions for outputting a music score which was produced as a result that the original music score has undergone the discarding, the appending and the changing.

9. The image processing apparatus according to claim 7, wherein the specifying unit specifies bars in a great staff of the music score.

10. The image processing apparatus according to claim 7, wherein the appending appends at least one of, a G clef, and an F clef.

11. The image processing apparatus according to claim 7, wherein the input unit inputs image data of the original music score.

12. The image processing apparatus according to claim 7, further comprising a determining unit for determining a number of pages of the input original music score,
    wherein the deciding unit decides the second block, according to the number of pages determined in the determining.

13. The image processing apparatus according to claim 7, wherein the outputting from the outputting unit includes displaying the music score which was produced as a result that the original music score has undergone the discarding, the appending, and the changing.

* * * * *